(12) United States Patent
Baratto et al.

(10) Patent No.: US 7,459,890 B2
(45) Date of Patent: Dec. 2, 2008

(54) METHOD AND CIRCUIT FOR CONTROLLING AN ELECTRIC POWER PLANT

(75) Inventors: Stefano Baratto, Naples (IT);
Francesco Giuffré, Messina (IT);
Umberto Macri, San Leucio (IT);
Mario Lavorgna, Bacoli (IT); Giuseppe D'Angelo, Casalnuovo di Napoli (IT);
Giovanni Moselli, Grumo Nevano (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 251 days.

(21) Appl. No.: 11/286,586

(22) Filed: Nov. 23, 2005

(65) Prior Publication Data

US 2006/0132103 A1    Jun. 22, 2006

(30) Foreign Application Priority Data

Nov. 23, 2004    (IT) .......................... VA2004A0055

(51) Int. Cl.
*H02P 11/00*    (2006.01)
*H02P 9/00*    (2006.01)
*H02H 7/06*    (2006.01)

(52) U.S. Cl. .............................. 322/44; 322/24; 322/17

(58) Field of Classification Search .................. 322/44, 322/24, 17, 28, 38, 14, 7
See application file for complete search history.

(56) References Cited

U.S. PATENT DOCUMENTS 5,349,646 A * 9/1994 Furuta et al. ................ 706/23
5,532,918 A * 7/1996 Mayrand et al. ............... 363/89
6,700,214 B2 * 3/2004 Ulinski et al. .............. 290/40 C
6,703,793 B2 * 3/2004 Kitano ....................... 315/224
6,853,893 B2 * 2/2005 Corcione et al. .............. 701/22
6,856,038 B2 * 2/2005 Rebsdorf et al. .............. 290/44
2004/0111219 A1 * 6/2004 Gulati ......................... 702/19
2005/0169658 A1 * 8/2005 Hanamoto et al. ............ 399/88
2006/0225710 A1 * 10/2006 Taglialatela-Scafati et al. .......................... 123/486
2006/0230821 A1 * 10/2006 Taglialatela-Scafati et al. .......................... 73/117.3
2007/0008666 A1 * 1/2007 Morita et al. ................. 361/42
2007/0227161 A1 * 10/2007 Boer et al. ..................... 62/56

OTHER PUBLICATIONS

Modern Dictionary of Electronics. Rudolf Graf, 1999. Newnespress, Seventh Edition, pp. 313.*

* cited by examiner

*Primary Examiner*—Julio Gonzalez
(74) *Attorney, Agent, or Firm*—Lisa K. Jorgenson; Allen, Dyer, Doppelt, Milbrath & Gilchrist

(57) ABSTRACT

A control circuit is for an electric power plant including an asynchronous generator of an AC voltage, a motor to rotate a rotor of the asynchronous generator as a function of a first control signal of a developed motor torque, and a bank of capacitors coupled to the asynchronous generator and having a total capacitance varying as function of a second control signal. The control circuit may include a monitor circuit to monitor at least one parameter of the AC voltage, and a control signal generator circuit cooperating with the monitor circuit to generate the first and second control signals by soft-computing techniques both as a function of the frequency and of a representative value of an amplitude of the AC voltage to make the AC voltage have a desired amplitude and frequency.

25 Claims, 21 Drawing Sheets

METHOD AND CIRCUIT FOR CONTROLLING AN ELECTRIC POWER PLANT

FIELD OF THE INVENTION

The present invention relates to electric power plants, and, more particularly, to a method and a relative soft-computing control circuit for a power plant.

BACKGROUND OF THE INVENTION

Improvements in the field of power electronics and the complexity of modern control systems increase the demands of asynchronous motors in variable speed electric actuators, because of their robustness and efficiency. Traditionally asynchronous machines have been used in electric power plants, essentially in applications wherein the stator winding is connected to the distribution mains. Typical applications of asynchronous machines are in wind or water driven power plants or combined heat and power generation plants (CHP).

The reasons of this traditionally restricted field of use is that asynchronous machines do not have an excitation winding and thus they require an initial magnetization for starting power generation and a reactive power source for sustaining the magnetic induction field during operation. Moreover, when an asynchronous machine supplies a passive network, the frequency of the output voltage is not tied to the rotation speed of the shaft, as in synchronous machines.

To better understand the addressed problem, the functioning principles of asynchronous machines are briefly explained. An asynchronous motor functions as a power generator when the absorbed electric power and the mechanical power applied to the shaft of the machine are both negative.

From a mechanical point of view, this means that a torque must be applied to the shaft of the machine for generating power. Depending on the applications, either a thermal motor, a gas turbine, the vanes of an wind or water turbine or even another electrical motor provides such a torque. From an electric point of view, to render negative the electrical power absorbed by the asynchronous machine, the real part of the impedance of the machine that may be calculated by solving the well-known equivalent circuit depicted in FIG. 1, to be less than zero.

This condition is verified, with a good approximation, for a slip σ ranging from 0 and −1. By definition:

$$\sigma = \frac{\omega - p\omega_r}{\omega}$$

with ω being the angular frequency of the voltage and/or of the stator current, p the number of polar pairs and $\omega_r$ the rotation speed of the shaft of the machine, this happens for rotation speeds larger than the synchronism speed $\omega_s$ $$\omega_s = \frac{\omega}{p}$$

This functioning condition is called "hyper-synchronism".

When the power plant is connected to the mains, the output voltage of the machine and its frequency are imposed. When the power plant is isolated from the mains, the generated voltage and frequency are not so forced and regulating them is not easy. Indeed, the frequency is not directly correlated with the rotation speed of the machine, but with the slip and thus by load conditions. Moreover, it is not possible to regulate the voltage by modifying the excitation, because there is no such input in asynchronous machines.

For maintaining the induction field in the magnetic gap it is necessary to use a reactive power source. This may be done by coupling a bank of capacitors to the system.

From these consideration, it is clear that the sole condition that ensures a sinusoidal steady state at the desired frequency is that the sum of the load impedance is null, including an excitation capacitance C connected in parallel to a load resistance $R_L$ (in the case of purely Ohmic load), and the impedance of the machine, i.e.:

$$\left. \begin{array}{l} \text{Re}\{\dot{Z}_{machine}\} = \text{Re}\{\dot{Z}_{load}\} \\ \Im m\{\dot{Z}_{machine}\} = \Im m\{\dot{Z}_{load}\} \end{array} \right\} \Rightarrow \begin{array}{l} R_s + \dfrac{\sigma\omega^2 L_m^2 R_r'}{R_r'^2 + \sigma^2\omega^2 L_r'^2} = -\dfrac{R_L}{1+\omega^2 R_L^2 C^2} \\ \omega L_s - \dfrac{\sigma^2\omega^3 L_m^2 L_r'}{R_r'^2 + \sigma^2\omega^2 L_r'^2} = \dfrac{\omega R_L^2 C}{1+\omega^2 R_L^2 C^2} \end{array} \quad (1)$$

wherein $\dot{Z}_{machine}$ is the impedance of the machine, $\dot{Z}_{load}$ is the load impedance, $R_s$ is the resistance of the stator windings, $R'_r$ the resistance of the rotor "seen" from the stator, σ is the slip, $R_L$ is the load resistance, C is the capacitance of the excitation bank of capacitors, $L_s$ is the stator leakage inductance and $L_m$ is the magnetization inductance of the machine.

The system described in Eq. (1) includes two algebraic equations involving four variables σ, ω, C e $R_L$. To have a singular solution, it is necessary to establish two of the four variables. Normally, these two variables are ω and $R_L$ because usually the load is readily established and the frequency must be constant and of a standard value (in Europe 50 Hz). The values of the capacitance C and of the slip σ may thus be calculated.

According to this approach, the rotation speed does not depend on the torque applied to the shaft of the generator. This condition is verified because the equations (1) hold in the hypothesis that $L_m$ be constant.

If magnetic nonlinearities are considered, the value of $L_m$ depends on the magnetization current and thus on the value of the torque. As a consequence, there is a functional connection between the rotation speed and the applied torque.

For establishing the nominal voltage, it is possible to impose that the electromagnetic torque $T_{el}$ and the mechanical torque $T_m$ be equal at steady state conditions:

$$T_{el} = T_m = \frac{3}{2} pL_m \left(\frac{V}{\dot{Z}_{load}}\right)^2 \frac{\sigma\omega R_r' L_m}{R_r'^2 + \sigma^2\omega^2 L_r'^2} \quad (2)$$

From the above considerations, the absolute value of the load impedance, and also the slip σ and the angular frequency ω, is determined once equations (1) are solved. Substituting the variable V with the desired voltage value, the torque to be applied to the asynchronous generator is determined.

A linear analysis, shows how the generated voltage and frequency depend on the torque and the capacitance. Typically, $L_m$ is considered constant, thus the generated voltage depends on the torque $T_m$ and the frequency depends on the capacitance C.

Literature describes asynchronous power generation systems in which voltage and frequency regulation are linearly implemented. Usually, the voltage is controlled by varying the total capacitance connected to the output line using a bank of capacitors individually connected into the circuit either electromechanically by contactors or electronically by using so-called "statcom" devices. Statcoms are devices that vary the impedance "seen" from the input nodes by configuring their switches. The frequency is controlled by adjusting the motor speed or by introducing a two-stage frequency converter between the asynchronous generator and the load.

A power plant that uses an asynchronous generator moved by a motor for supplying a load is depicted in FIG. 3. The functional blocks are identified by an identification number and a qualitative description of their functioning follows.

Block 1—Asynchronous Generator

The functioning of the asynchronous generator is determined by the following algebraic-differential equations:

$$\begin{cases} \underline{v}_s = R_s \cdot \underline{i}_s + L_s \frac{d}{dt}\underline{i}_s + L_m \frac{d}{dt}(\underline{i}'_r e^{jp\theta}) \\ 0 = R'_r \cdot \underline{i}'_r + L'_r \frac{d}{dt}\underline{i}'_r + L_m \frac{d}{dt}(\underline{i}_s e^{-jp\theta}) \\ J \frac{d^2}{dt^2}\theta = T_{el} - T_m \\ T_{el} = \frac{3}{2} p \cdot L_m \Im m \{\underline{i}_s \underline{i}'^*_r\} \end{cases} \quad (3)$$

wherein:

$\underline{v}_s$=symmetrical component of the stator voltage;
$\underline{i}_s$=symmetrical vector component of the stator current;
$\underline{i}'_r$=symmetrical vector component of the rotor current seen from the stator;
$R_s$=stator resistance;
$R'_r$=rotor resistance seen from the stator;
$L_s$=rotor leakage inductance;
$L'_r$=rotor leakage inductance seen from the stator;
$L_m$=magnetization inductance;
J=moment of inertia of the group;
θ=instant position of the reference integral with the rotor in respect to the inertial reference;
p=polar pairs;
$T_{el}$=electromagnetic torque; and
$T_m$=motor torque.

To make the asynchronous machine operate as a generator, the following inequalities must be satisfied:

$T_{el}$<0 and $T_m$<0.

By analyzing the mathematical model, the system of equations (3) includes two differential vectorial equations and one algebraic vectorial equation, but includes three vectorial variables ($\underline{v}_s$, $\underline{i}_s$, $\underline{i}'_r$) and a scalar variable (θ).

The variables are determined by considering together equations (3) with equations (1) that describe the functioning of the power plant. When the plant is connected to the mains, a vectorial condition is introduced by specifying the module and the phase of the symmetric voltage component, as imposed by the mains.

Block 2—Motor

The motor PRIME MOVER is functionally represented as a block input with a signal coming from the control circuit for applying a corresponding torque ($T_m$) to the shaft of the asynchronous generator. As a matter of fact, the torque $T_m$ may be constant, for example, by approximately considering the torque-speed characteristic of an engine in a certain range, or it may be a function of a certain parameter of the power generation plant (for example the speed). This naturally depends on the type of the prime mover.

Block 3—Electric Load and Excitation Group

This functional block may be described as shown in FIG. 4, wherein $i_s$ is the symmetric component of the stator current;
$i_c$ is the current of the excitation group;
$i_L$ is the load current;
C is the capacitance of the excitation group;
$L_L$ is the load inductance;
$R_L$ is the load resistance; and
V is the symmetric component of the stator voltage.

The functioning of the circuit of FIG. 4 may be described by the following system of differential equations:

$$\begin{aligned} \frac{dV}{dt} &= -\frac{i_s + i_L}{C} \\ \frac{di_L}{dt} &= \frac{1}{L_L}V - \frac{R_L}{L_L}i_L \end{aligned} \quad (4)$$

These two equations, together with equations (3) allow solving the system of differential equations when the system is isolated from the mains. The excitation group, schematically represented by the capacitance C of FIG. 4, must be capable of delivering a reactive power that varies as a function of the needs of the asynchronous generator and of the load. For this reason the capacitance connected to the output line must be adjustable.

Block 4—Control Circuit

It is the functional block that corrects the capacitance and torque values for regulating the generated voltage and its frequency.

Block 5—Remote Control Switches

Remote control switches select the functioning mode of the power plant: from the "grid-connected" mode (switches closed) to the "isolated" mode (switches open) or vice versa. Through special studies, the Applicant found that the commonly used separate control for voltage and for frequency, as illustrated in FIG. 5, could lead to conditions of instability or to excessively long transients before reaching the desired values because of interference between the two controllers (VMAX CONTROLLER, FREQ CONTROLLER). Moreover, such a control may not be sufficiently precise because the real system is magnetically nonlinear. It is well known that there are functioning conditions of an asynchronous generator at which the saturation of magnetic circuits contributes to limit the output voltage.

SUMMARY OF THE INVENTION

This invention provides a method and a control circuit for an electrical power plant employing an asynchronous machine, capable of ensuring constancy of the output supply voltage and frequency (for example Vrms=220 [V], f=50 [Hz]) applied to a passive network connected to it, under virtually any load condition.

According to this invention, the control is implemented with soft-computing techniques (for example with a fuzzy logic control circuit), that allow generating control signals for adjusting the total capacitance C connected to the output line and the torque that the motor must deliver, both as a function of the sensed output voltage and frequency.

The fact that both the capacitance C and the torque Tm are adjusted as a function of both the voltage and frequency, allows control with enhanced precision pf the generated voltage even under functioning conditions at which magnetic non linearities are no longer negligible.

The control method for an electric power plant overcomes or significantly lessens the discussed problems and/or inefficiencies when using an asynchronous generator in the "isolated" mode and/or under a variable load conditions. More precisely, the method and related control circuit are for an electric power plant comprising an asynchronous generator for generating an AC voltage of a certain frequency on at least one output line, a prime motor for rotating the shaft of the asynchronous generator with a torque controlled through a first control signal for regulating the generated AC voltage, and a bank of capacitors the total capacitance of which connected to the output line is adjusted as a function of a second control signal for regulating the AC frequency.

Basically, the control circuit may generate each of the control signals by a soft-computing technique as a function of both the monitored AC frequency and amplitude of the generated AC voltage. The control circuit may be incorporated in an asynchronous generator power plant. The method may be implemented by software executed by a computer.

According to another innovative, the total capacitance connected to supply lines for matching a load may be adjusted by way of a switched L-C network, including a capacitor connected in parallel to the series connection of a switch and an inductor. By varying the turn on delay of the switch with respect to a zero-crossing event of the voltage on the supply lines, it is possible to vary the reactive power absorbed by the L-C network. This switched L-C network may be used for realizing a device for matching both a capacitive and an inductive load.

An innovative architecture of a driver for turning on a thyristor connected to a supply line is provided. Preferably, the switch of the above mentioned L-C network includes two thyristors connected in anti-parallel fashion and this driver is used for turning them one on. A load estimator is also provided for estimating the reactive power required by a load.

BRIEF DESCRIPTION OF THE DRAWINGS

The invention will be described referring to the attached drawings, wherein.

DETAILED DESCRIPTION OF THE PREFERRED EMBODIMENTS

The system of this invention has a control circuit that uses soft-computing techniques based on fuzzy logic or neural networks for conjunctively processing shifts (errors) from both the requested values of generated AC voltage and frequency. From these frequency and voltage shift information, through appropriate soft-computing rules, it determines capacitance and torque values needed by the power plant for stabilizing its functioning at the desired output voltage and frequency values (for instance Vrms=220V, f=50 Hz).

Figure 6:
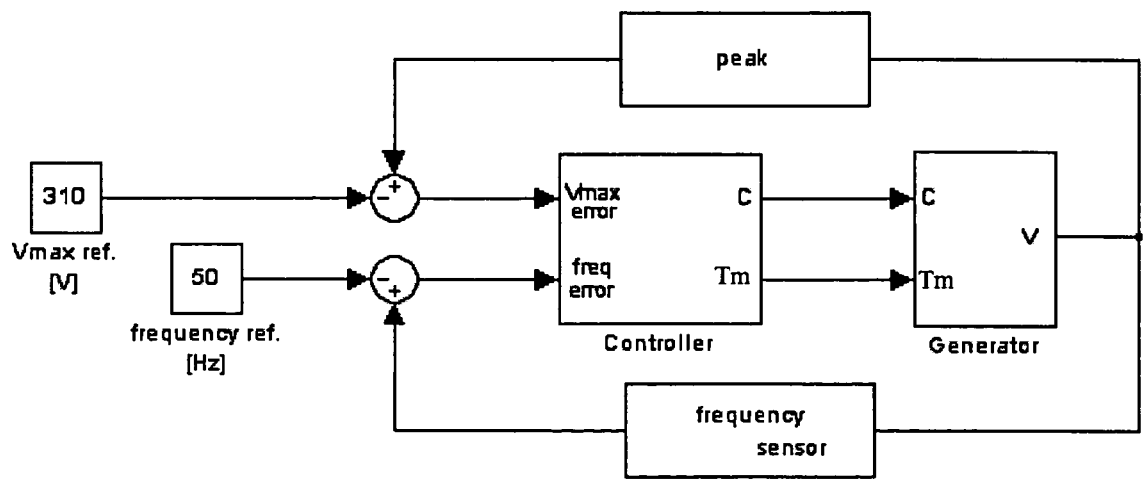
FIG. 6 is a block diagram of the control circuit of the power plant of FIG. 3 as in the prior art.

The control method of this invention contemplates a voltage and frequency feedback, according to the scheme of a sample embodiment of the control circuit of this invention of FIG. 6, wherein, as for all the figures, being:

Vmax ref.: the peak reference voltage (310V);
frequency ref.: the reference voltage (50 Hz);
Vmax: the measured peak voltage;
f the "measured" (or estimated) frequency value;
Vmax error: the peak voltage error;
freq error: the frequency error;
C the total capacitance connected to the output line;
$T_m$ the torque delivered by the driving prime mover.

It should be recalled that the values of C and of the torque Tm depend on the load supplied by the asynchronous generator, because its variations influence both frequency and the generated voltage.

The control technique uses a sole sensor of the generated AC voltage, because the frequency information may be obtained from an analysis of the sensed AC voltage signal, for instance by a dedicated software program. This may be done by executing with a microprocessor software that calculates the FFT (Fast Fourier Transform) of the generated AC voltage, producing a signal representative of the AC frequency corresponding to the first harmonic.

An alternative way is to use a frequency meter having an internal circuit that generates a pulse at each zero-crossing of the AC voltage or in correspondence with a maximum or a minimum, and a counter of the number of pulses detected in a unit time for producing a signal representative of the AC frequency.

The approach has the following advantages:
it permits use of asynchronous machines in an isolated mode for generating a voltage of desired amplitude and frequency;
the generated voltage and its frequency are conjunctively controlled by adjusting the driving torque and the line capacitance, effectively preventing the risk of unstable conditions or excessively long transient times; and
it requires only one physical sensor, i.e. a voltage sensor, because the AC frequency information may be obtained by processing via software the sensed AC voltage.

Figure 7:
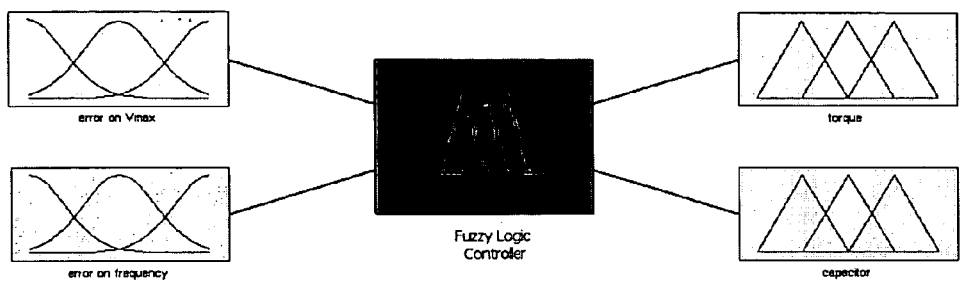
FIG. 7 is a basic scheme of a fuzzy control circuit for a power plant of this invention.

As a particular case of the control system, let us refer to an example of suitable fuzzy control system having the architecture depicted in FIG. 7. The control circuit of FIG. 7 allows control of the driving torque and the capacitance as a function of the monitored AC voltage and frequency irrespective of how the output variables may depend from the input variables under the current functioning conditions (e.g. load conditions). The control system determines the mechanical torque to be applied to the shaft of the asynchronous generator and the value of the capacitance of the excitation bank of capacitors coupled to the output line, to reach the desired steady-state voltage and frequency values, that is a condition at which the errors on the peak voltage value and on frequency becomes practically null (in a fuzzy sense).

The adjustment logic of torque and capacitance values will be described later together with the fuzzy control unit.

The control circuit intervenes every time the frequency and voltage values are determined, as follows:

$$C_{current} = C_{previous} \pm \Delta C$$

$$T_{m\text{-}current} = C_{m\text{-}previous} \pm \Delta Tm$$

Starting from a certain capacitance or torque value, the correction $\Delta C$ or $\Delta tm$ to be affected will be algebraically added to the previous value.

Figure 8:
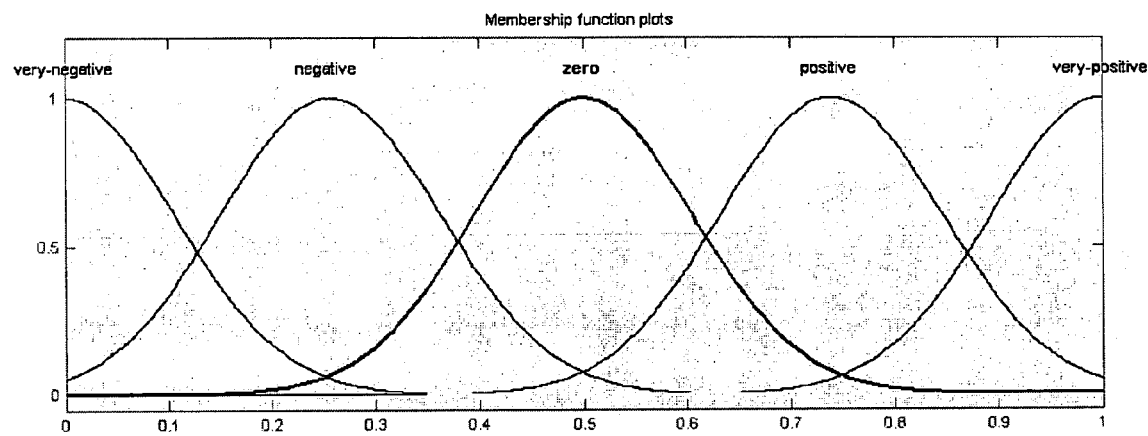
FIG. 8 depicts sample "membership functions" of the inputs of a fuzzy control circuit of this invention.
Figure 9:
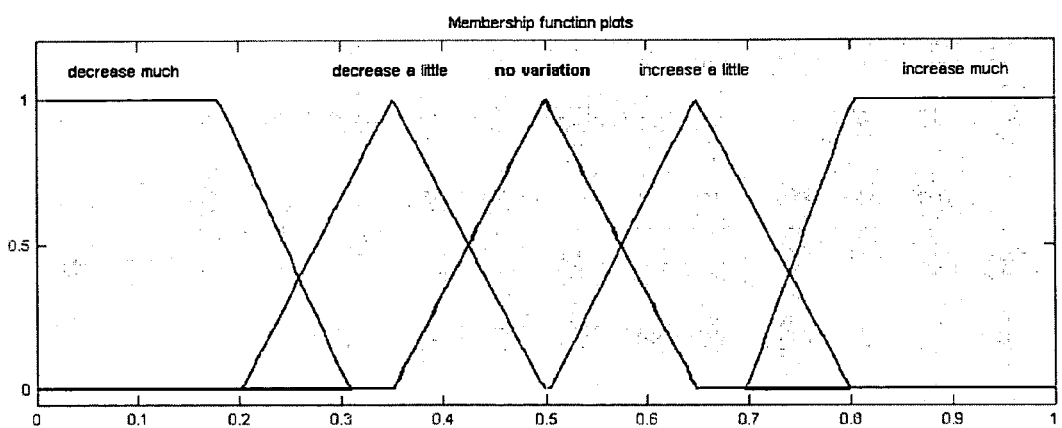
FIG. 9 depicts samples of the "membership functions" of the outputs of a fuzzy control circuit of this invention.

The implemented fuzzy system contemplates Gaussian "membership functions" for the input variables, as shown by way of example in FIG. 8, and triangular/trapezoidal membership functions for the output variables, as shown by way of example in FIG. 9. The shown example refers to a Mamdami type FIS (Fuzzy Inference System) [1, 2, 3].

[1] Mamdani, E. H. and S. Assilian, "An experiment in linguistic synthesis with a fuzzy logic controller," International Journal of Man-Machine Studies, Vol. 7, No. 1, pp. 1-13, 1975.
[2] Mamdani, E. H., "Advances in the linguistic synthesis of fuzzy controllers," International Journal of Man-Machine Studies, Vol. 8, pp. 669-678, 1976.
[3] Mamdani, E. H., "Applications of fuzzy logic to approximate reasoning using linguistic synthesis," IEEE Transactions on Computers, Vol. 26, No. 12, pp. 1182-1191, 1977.

As it is evident, FIGS. 8 and 9 are conceived by considering a normalization of the inputs and a consequent de-normalization of the outputs, such to make all fuzzy variables range between 0 and 1.

For the type of plant to be controlled, a set of 13 fuzzy rules, of the type

If (condition1) and (condition2) then (condition3) and (condition4)

was considered.

Figure 10:
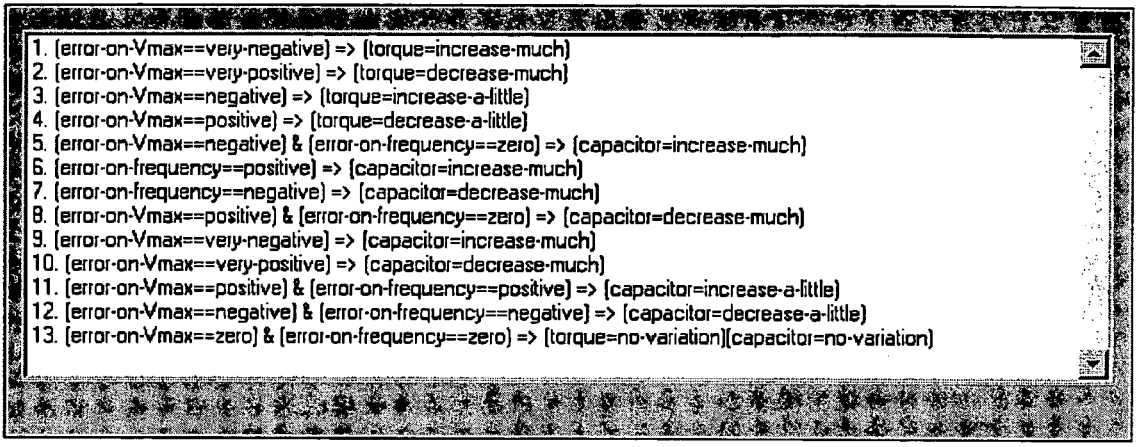
FIG. 10 shows a set of rules that describe a fuzzy control circuit of this invention.

FIG. 10 shows a sample set of rules for realizing a fuzzy control circuit of an asynchronous machine power plant. Of course, it is possible to use a set of a different number of fuzzy rules even of different structure from the sample embodiment described.

Alternatively, the control may be implemented with any other soft-computing technique. For example, the control circuit may be based on the use of a neural network, previously trained for keeping constants the amplitude and the frequency of the AC voltage by generating appropriate control signals of the output line capacitance and of the driving torque of the asynchronous generator.

In order to test its effectiveness, the control method has been simulated using an asynchronous generator specified by the nominal values of Table 1:

TABLE 1

| Description | Value |
| --- | --- |
| Nominal power [$S_n$] | 11 [kVA] |
| Nominal voltage [$V_n$] | 220 [V] |
| Nominal frequency [fn] | 50 [Hz] |
| Number of polar pairs [p] | 2 |
| Moment of inertia of the system [J] | 0.73 [kg m$^2$] |
| Stator resistance [$R_s$] | 0.5 [$\Omega$] |
| Rotor resistance [$R'_r$] | 0.328 [$\Omega$] |
| Stator leakage inductance [$l_s$] | 3.2 [mH] |
| Rotor leakage inductance [$l'_r$] | 3.2 [mH] |
| Magnetization inductance [$L_m$] | 159 [mH] |

A prime mover with torque characteristics independent from the rotation speed was considered.

Electric Load and Excitation Circuit

Figure 11:
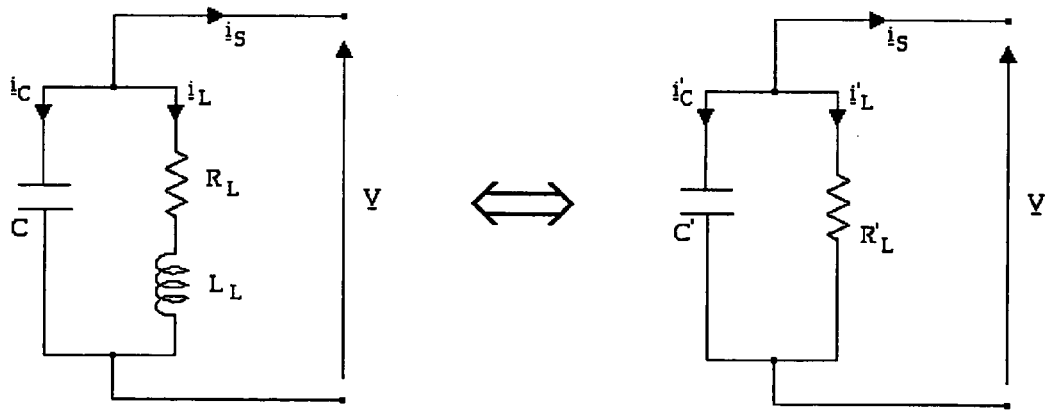
FIG. 11 shows an R-C network equivalent to an R-C-L network as in the prior art.

For testing purposes, a purely resistive load was considered, in consideration of the fact that this choice does not limit the applicability of the control method because any R-L-C network may be transformed in an equivalent R-C network, as shown in FIG. 11, through the following equations:

$$\begin{cases} R'_L = R_L + \dfrac{\omega^2 L_L^2}{R_L} \\ C' = C - \dfrac{L_L}{R_L^2 + \omega^2 L_L^2} \end{cases} \quad (5)$$

For the test, a 4 kW load, corresponding to a torque of 26 Nm and a capacitance of 70 μF (theoretical values obtained by solving numerically Eqs. (1)), was used.

After 5 seconds of steady-state running a step variation of the load was made, decreasing the absorbed power down to 3 kW. The results of the simulations are depicted in the Figures from 12 to 15.

Figure 12:
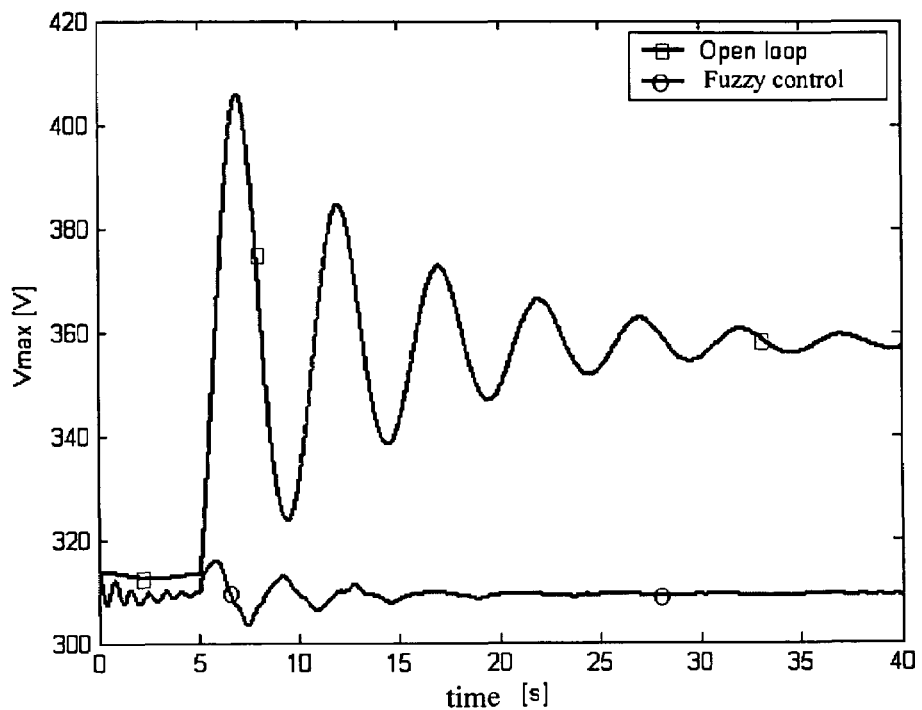
FIG. 12 compares time graphs of the maximum output voltage of the asynchronous generator in case of open-loop control and of a control carried out with a fuzzy control circuit of this invention.
Figure 13:
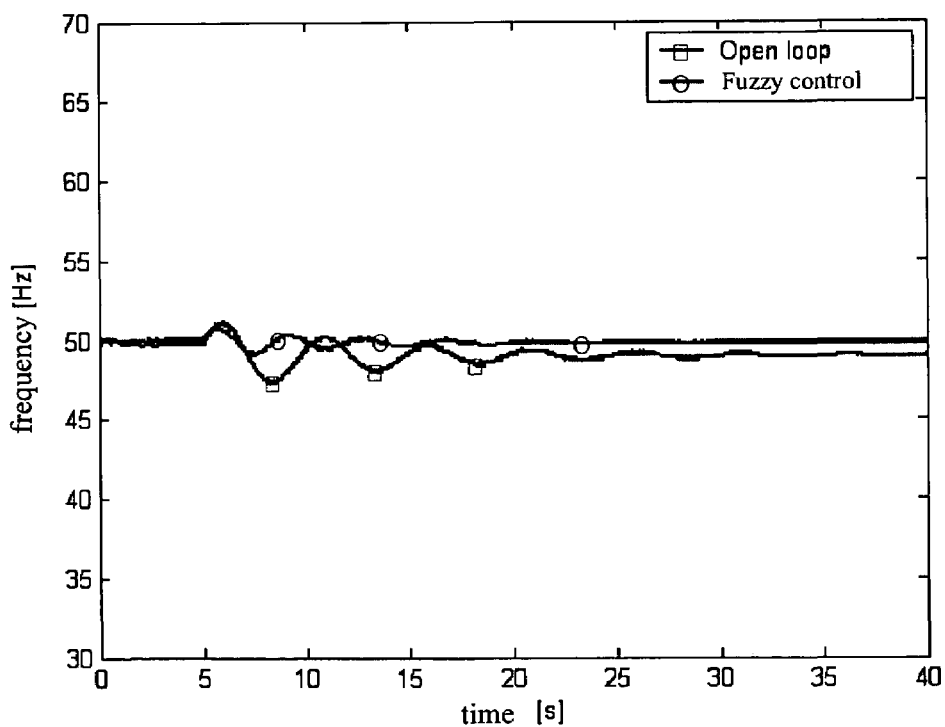
FIG. 13 compares time graphs of the output frequency of the asynchronous generator in case of an open-loop control and of a fuzzy control circuit of this invention.
Figure 14:
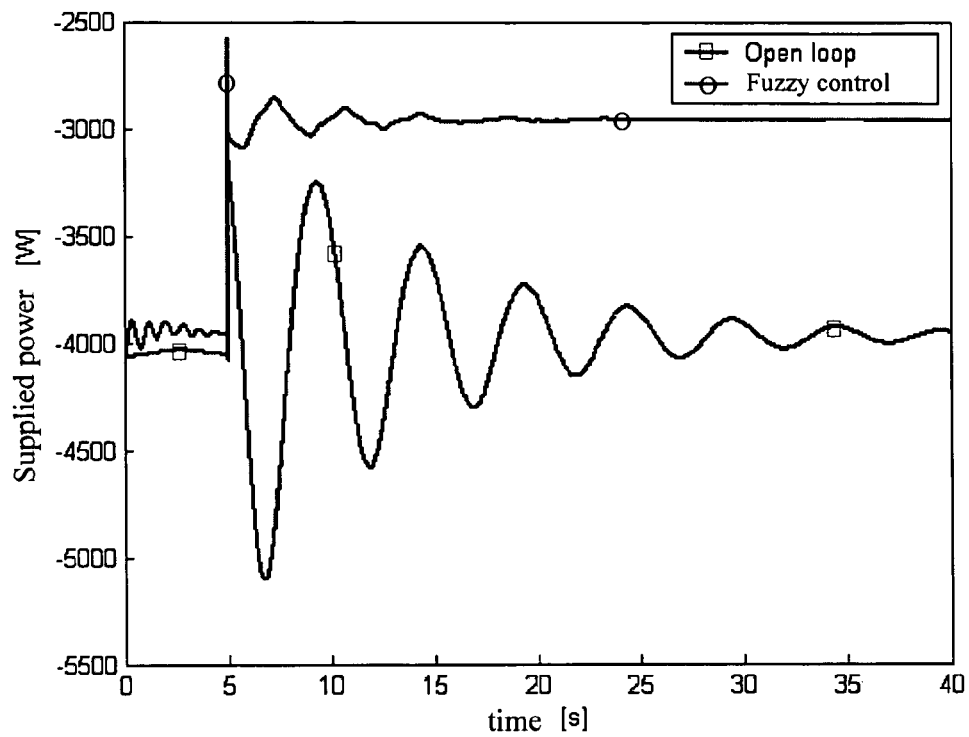
FIG. 14 compares time graphs of the power generated by the asynchronous generator in case of open-loop control and of a fuzzy control circuit of this invention, FIG. 15 compares time graphs of the torque produced by the asynchronous generator for an open-loop control and a fuzzy control circuit of this invention.
Figure 15:
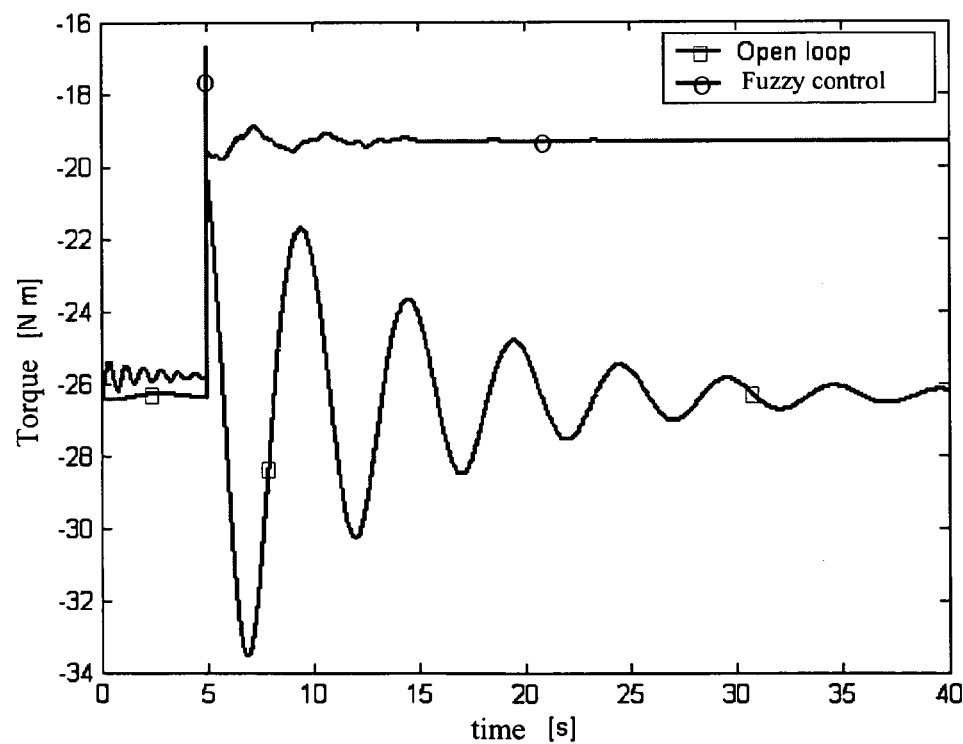

The depicted graphs provide an immediately perceived compensation between the performance of a traditional open-loop controlled power plant with the performance of the disclosed power plant:

- timing diagrams of the peak voltage value (FIG. 12);
- timing diagrams of the frequency (FIG. 13);
- timing diagrams of the delivered power (FIG. 14); and
- timing diagrams of the electromagnetic torque developed by the asynchronous generator (FIG. 15).

FIGS. 12 to 15 clearly show that the performances of the control circuit are very satisfactory, because it ensures a practically null steady-state error while significantly limiting over-elongations during transients. Moreover, the transient time becomes very short. By contrast, if the feedback control loop is opened (open-loop), the asynchronous machine does not attain the desired steady-state functioning conditions.

The power plant is capable of ensuring outstandingly good performance even when functioning in an isolated mode. The plant supplies to the load the required electric power with an outstandingly satisfactory "power quality" factor, that is with a voltage of 220 V±10%, a frequency of 50 Hz±1%, and a Total Harmonic Distortion (THD)<6%.

Figure 1:
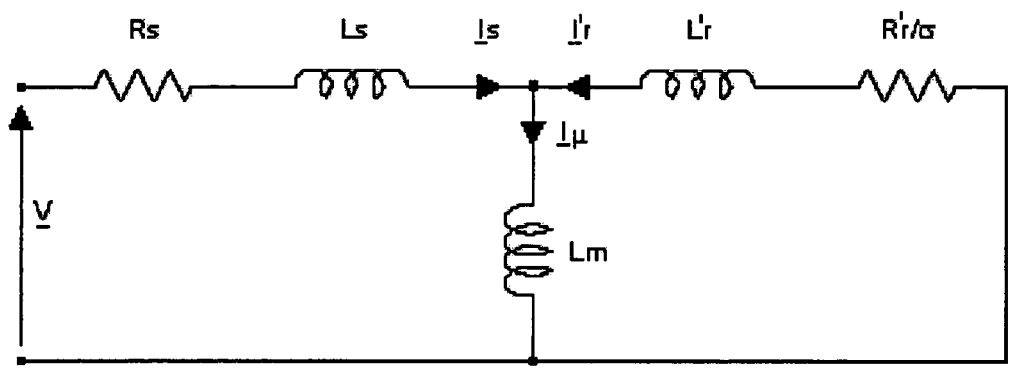
FIG. 1 shows the equivalent circuit of an asynchronous machine in a sinusoidal steady-state as in the prior art.
Figure 2:
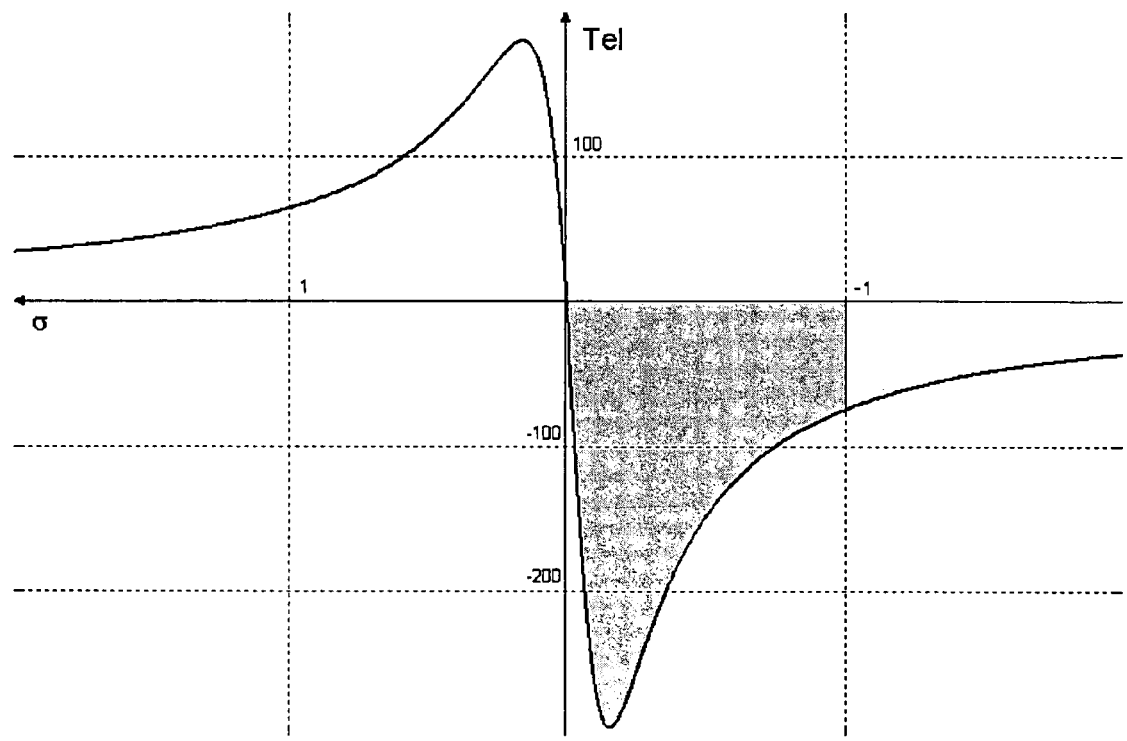
FIG. 2 is the electromagnetic torque characteristic of an asynchronous machine while in a sinusoidal steady-state, wherein the functioning zone as a generator is highlighted as in the prior art.
Figure 3:
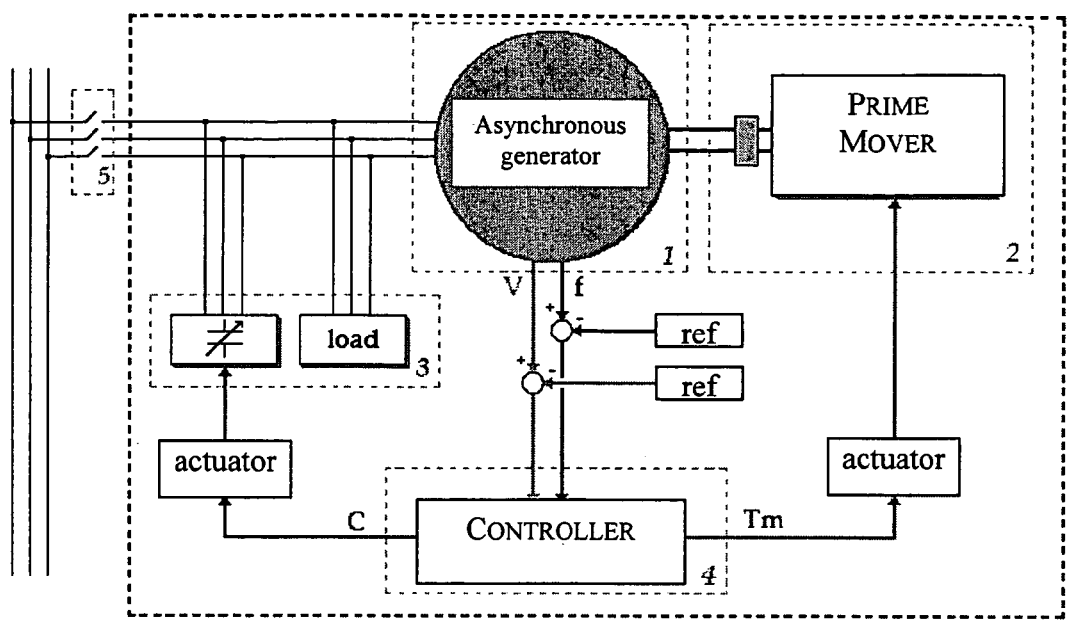
FIG. 3 shows a functional scheme of a power plant employing an asynchronous generator as in the prior art.
Figure 4:
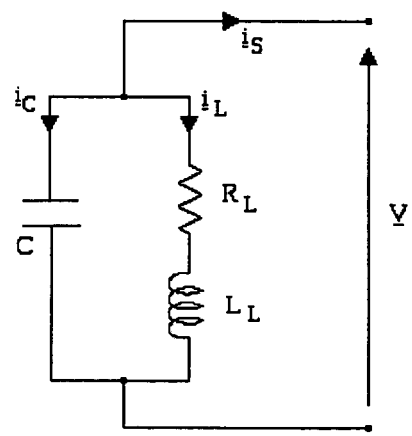
FIG. 4 shows the equivalent load and excitation circuit as in the prior art.
Figure 5:
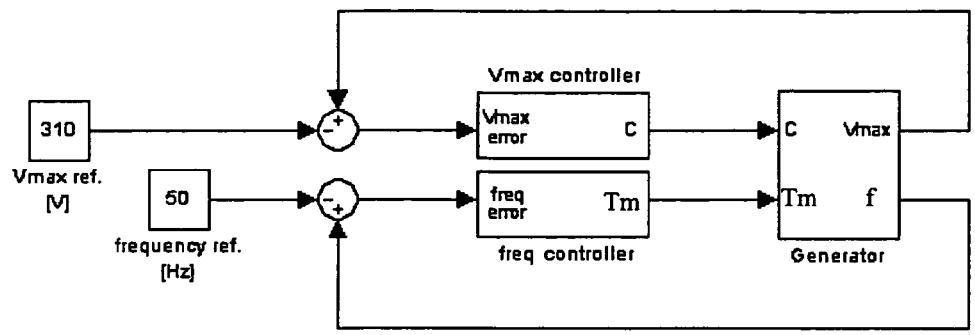
FIG. 5 shows a common control circuit with distinct voltage and frequency linear control loops as in the prior art.

As remarked above, a very important task in asynchronous machine plants is to provide to the load the reactive power it needs. As stated before, the reactive power required by the load is in general not constant, and for this reason the scheme of FIG. 3 includes a bank of capacitors the interconnections of which are configurable to provide a desired total capacitance C coupled to the output line of the AC generator.

Figure 16:
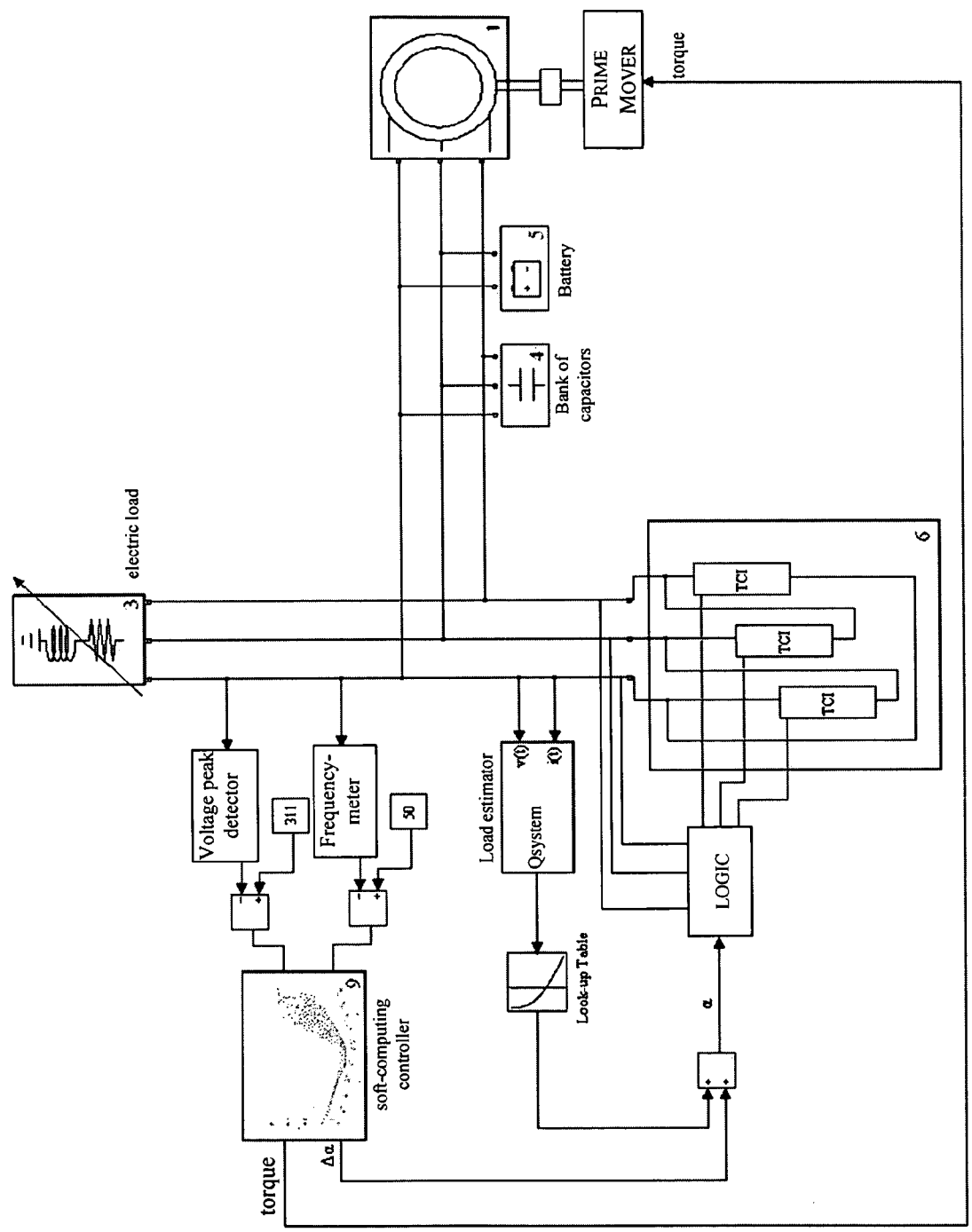
FIG. 16 shows a functional scheme of a power plant according to a second embodiment of this invention.

According to another innovative aspect of the system and method, a much simpler and less expensive solution, as shown in the scheme of FIG. 16, is provided. As may be observed, FIG. 16 includes a bank of capacitors of fixed values and the total capacitance connected to the output line, and so the total reactive power supplied to the load, is adjusted by special switched L-C networks, hereinafter designed as "Thyristor Controlled Inductors" (or more briefly TCI).

FIG. 16 shows also the presence of a battery for biasing the fixed capacitors with a certain initial voltage. This is detected by the fact that the asynchronous machine may accidentally have no residual magnetization caused by a de-magnetizing event, such as a short circuit. It has been verified experimentally that a relatively low voltage (24V) is sufficient for starting the self-excitation phenomenon of the asynchronous machine.

The Thyristor Controlled Inductors are devices capable of generating a reactive power that may be electronically adjusted. In practice, they are static regulators of reactive power that may match any kind of AC load, because they may generate both a capacitive and an inductive type reactive power simply by adjusting the turn on instant of the switch, as will be shown later.

Figure 17:
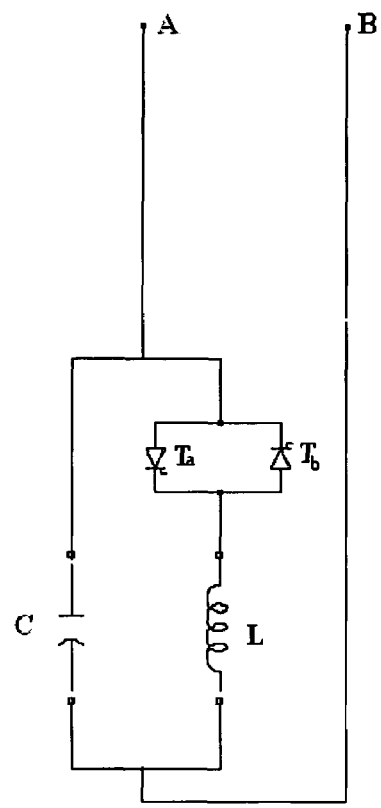
FIG. 17 shows a thyristor controlled inductance device of this invention.

A mono-phase TCI includes a capacitor connected in parallel to a switched inductor, as shown in FIG. 17. The switches are two thyristors that turn on when their anode-cathode voltage is positive and a gate pulse is supplied, and that turn off when they are negatively biased. In AC systems, they turn off "automatically" when the AC current inverts its direction.

Figure 18:
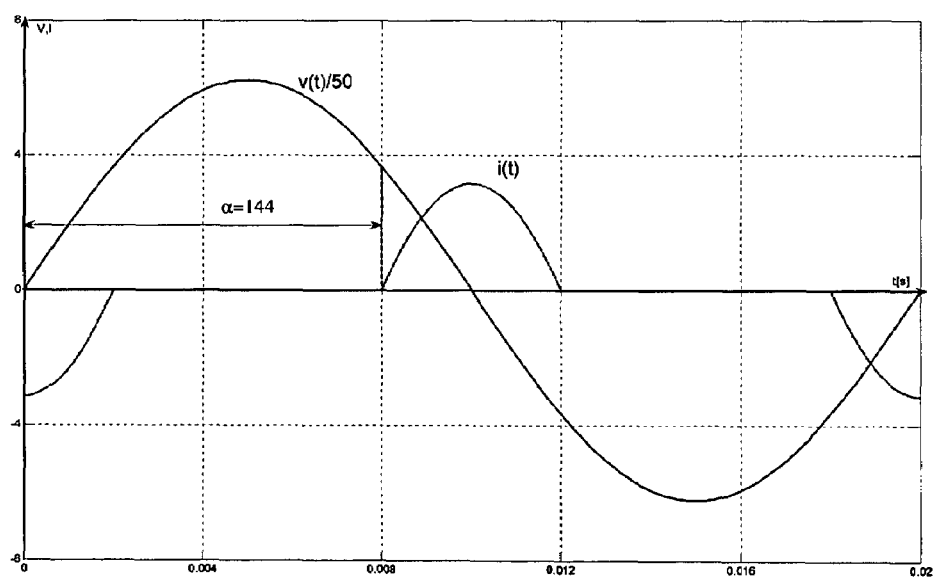
FIG. 18 shows waveforms of the voltage and current supplied to the load from the circuit of FIG. 17.

The turn-on pulse may be supplied at any instant in which the anode-cathode voltage is positive, that is they may be turned on within 180 electrical degrees of the AC waveform. To match an inductive type reactive power requirement of the load, the turn-on delay angle α of the thyristors may be larger than 90 electrical degrees, as shown in FIG. 18.

The reactive power supplied to the load is adjusted by varying the turn on delay angle α, because the root-mean-square (rms) voltage of the main harmonic component varies as a function of this angle. In particular, it is possible to verify that the maximum inductive reactive power is absorbed for α=90°, while the maximum capacitive reactive power is absorbed for α=180°.

Figure 19:
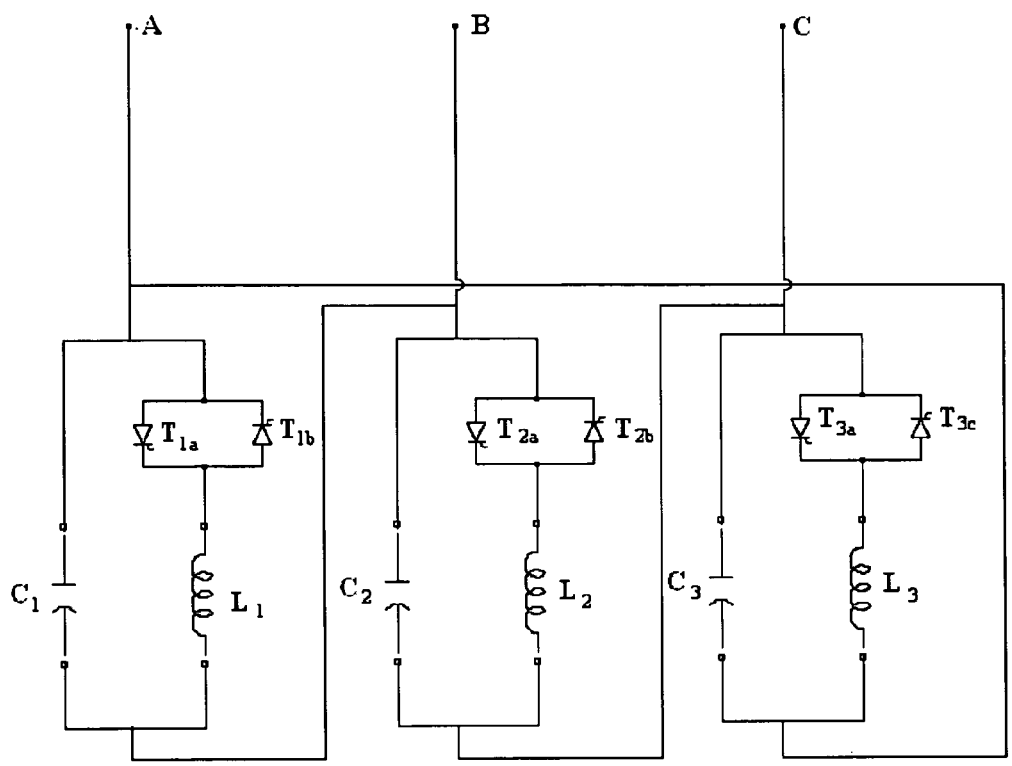
FIG. 19 depicts three devices of FIG. 17 connected in a triangle fashion for matching variations of the reactance of a supplied load.

A problem due to the use of this structure is that it implies a relevant harmonic distortion. In particular, a third harmonic component is present, that worsens the power factor of the system. In three-phase systems, this problem may be solved by connecting the TCIs in a triangle configuration, as shown in FIG. 19.

Figure 20:
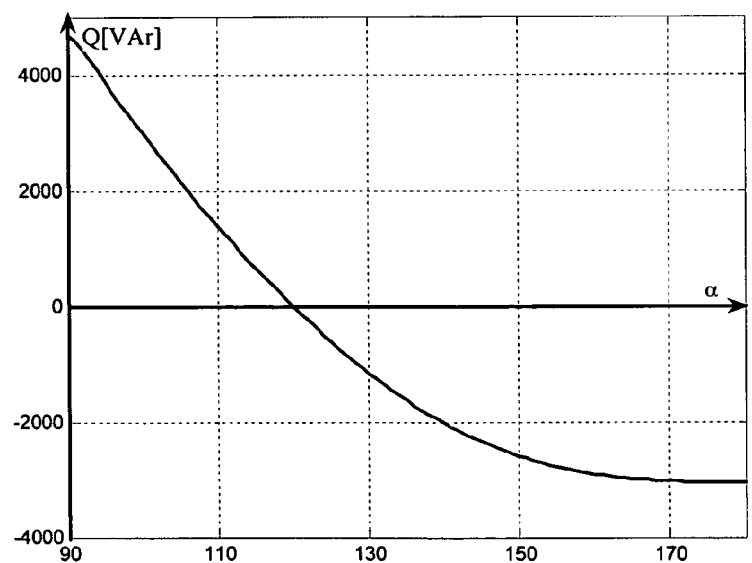
FIG. 20 depicts a sample characteristic of the device of FIG. 17.

For example, by using inductors of 0.06 H and capacitors of 66.5 μF it is possible to obtain the characteristic of the reactive power depicted in FIG. 20 on each branch of the triangle as a function of the turn-on delay angle.

As shown in the graph, at about α=120° the sign of the reactive power inverts and, for larger delay angles, becomes negative. Unless particular functioning conditions occur, the delay angle is chosen in correspondence with a negative reactive power Qvar, for the case of a Ohmic-inductive load to be matched.

Clearly, the values of the inductors and capacitors may differ from those indicated above, provided that the resonance frequency of each L-C branch of the triangle be tuned at 50 Hz, that is the standard mains frequency in Europe. Of course, in countries with a different mains frequency, the capacitance and inductance of the TCI will be established such to make the resonance frequency tuned at the different standard frequency.

Figure 21:
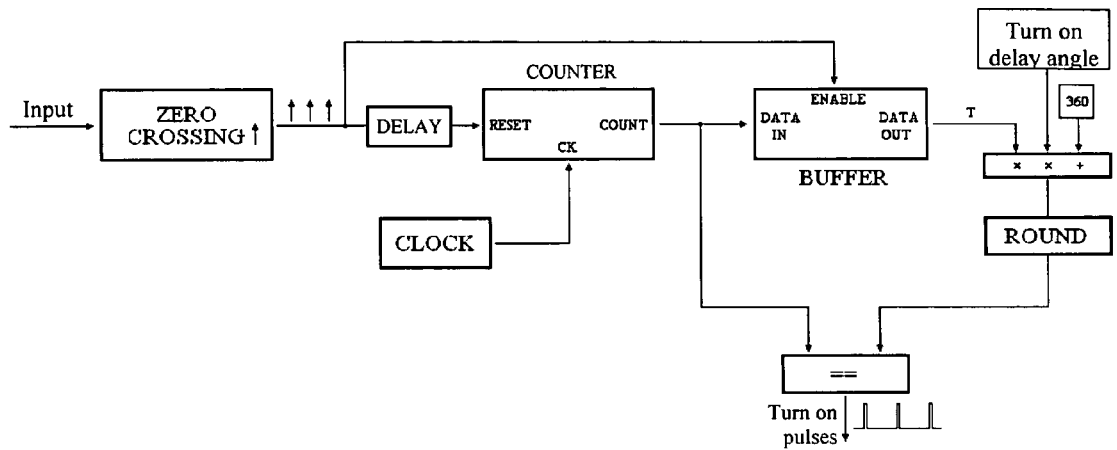
FIG. 21 shows a device of this invention for generating command pulses of a thyristor in correspondence with a certain electrical angle.

A block diagram of the driver LOGIC for generating command pulses to the gates of thyristors in correspondence with a pre-established delay angle α, independently from the frequency of the output voltage, is shown in FIG. 21.

The functioning of the driver may be summarized as follows:

1. The voltage signal is input to a zero-cross device ZERO CROSSING, that generates a pulse each time the output voltage crosses the null voltage and is increasing. The block ZERO CROSSING may be realized with analog components, for example a Schmitt trigger, a differentiating stage and a null voltage detector;
2. Each pulse generated by the block ZERO CROSSING is delayed by a delay line DELAY and resets a counter. The counter outputs the number COUNT of clock pulses counted between two consecutive reset pulses;

3. Each pulse generated by the block ZERO CROSSING enables a latch BUFFER to store the value COUNT output by the counter. The delay line DELAY is designed to provide enough time to the latch to store the value COUNT before the counter is reset. Preferably, the delay corresponds to one clock period;
4. The datum stored in the buffer is successively multiplied by a reference value for α, independent from the voltage frequency, divided by 360° and rounded to integer value for obtaining an estimation of the angle α in terms of number of pulses. The value stored in the buffer is proportional to the period of the voltage supplied to the load; and
5. The value COUNT is compared with the value calculated during the last step and, when equal, a turn-on pulse for the thyristors is generated.

Alternatively, all the above steps could be realized via software executed by a microcontroller.

Figure 22A:
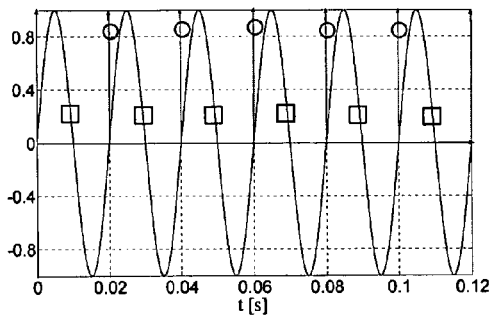
FIGS. 22A to 22F show time graphs of the main signals of the device of FIG. 21.
Figure 22B:
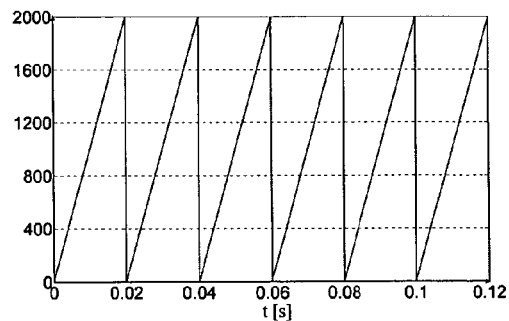
Figure 22C:
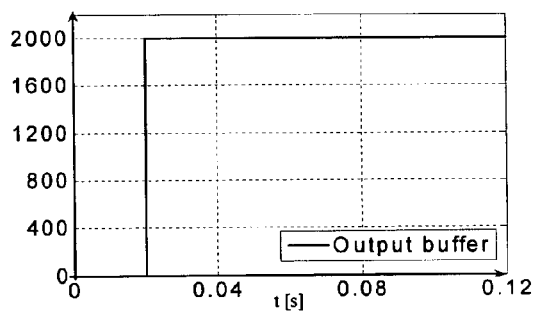
Figure 22D:
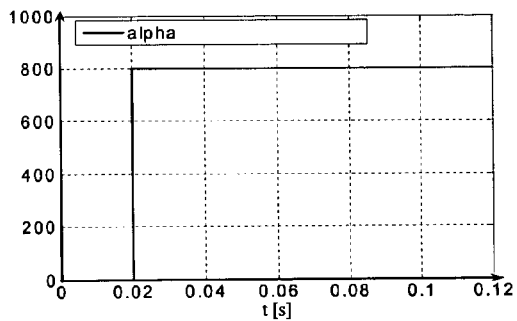
Figure 22E:
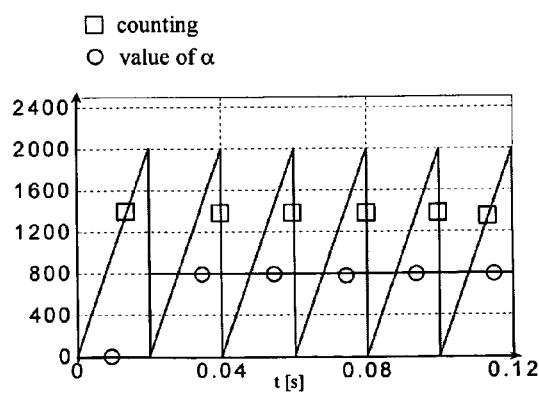
Figure 22F:
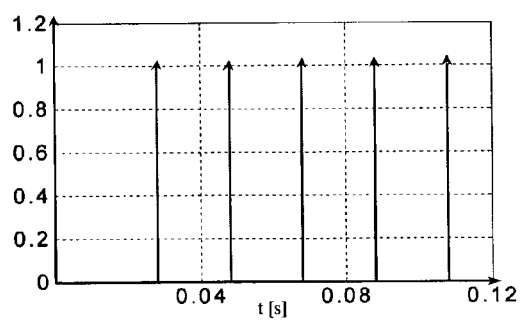

Time graphs of the main signals of the circuit are depicted as follows:

FIG. 22A shows the voltage on the load and the generated zero-cross pulses;

FIG. 22B shows the signal COUNT representing the number of clock pulses counted by the counter;

FIG. 22C shows the logic value stored in the latch BUFFER;

FIG. 22D shows the signal that represents the turn on delay angle α, that in this particular case is 144° (corresponding to 800 clock pulses); and FIGS. 22E and 22F show how turn on pulses of thyristors are generated upon comparing the ramp signal COUNT with the value of the turn on delay angle α.

Figure 23:
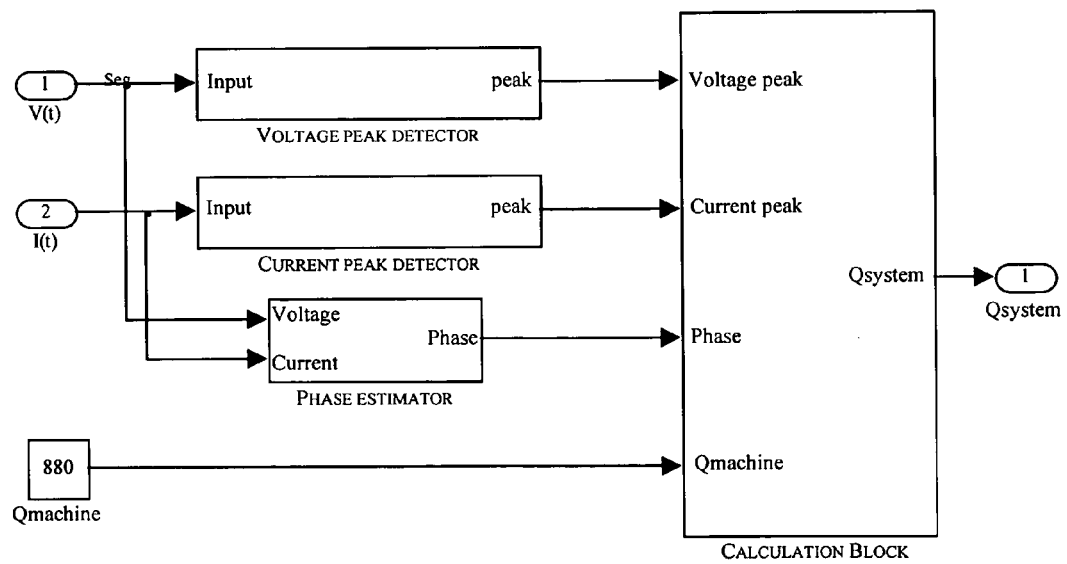
FIG. 23 is a detailed view of the block LOAD ESTIMATOR shown in FIG. 16 for estimating the total reactive power required by the load.

FIG. 23 is a detailed view of the block LOAD ESTIMATOR shown in FIG. 16. This circuit estimates the total reactive power Qsystem absorbed by the devices connected to the supply line and that must be matched, namely the asynchronous machine and the supplied load. It comprises two peak detectors, one for the voltage, VOLTAGE PEAK DETECTOR, and the other for the current, CURRENT PEAK DETECTOR, an estimator of the voltage-current phase-difference, PHASE ESTIMATOR, and a calculation block for estimating the total reactive power Qsystem in function of the peak voltage, the peak current, the phase angle between current and voltage and the reactive power Qmachine required by the asynchronous generator.

Figure 24:
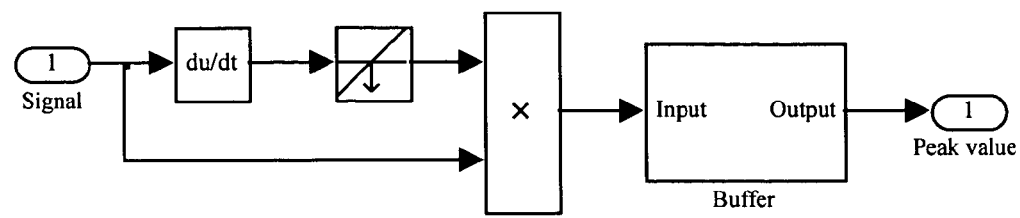
FIG. 24 is a detailed view of the block shown in FIG. 23 for estimating the peak value of the voltage.
Figure 25A:
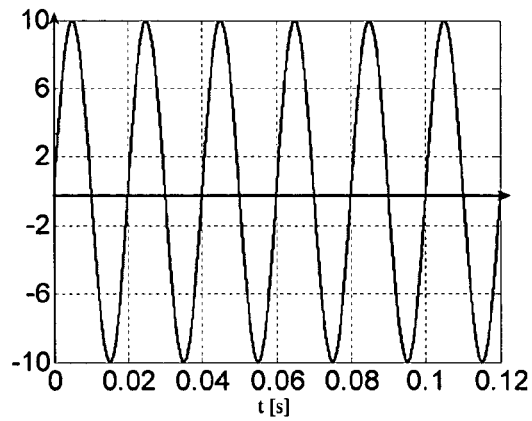
FIGS. 25A to 25D are time graphs of the main signals of the circuit depicted in FIG. 24.
Figure 25B:
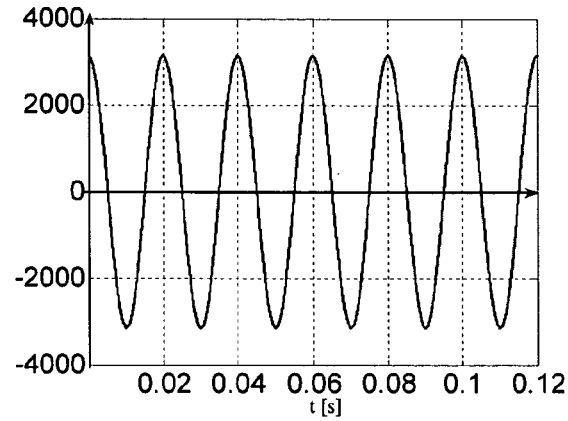
Figure 25C:
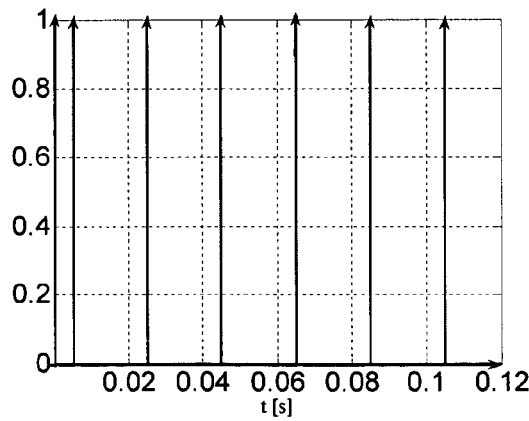
Figure 25D:
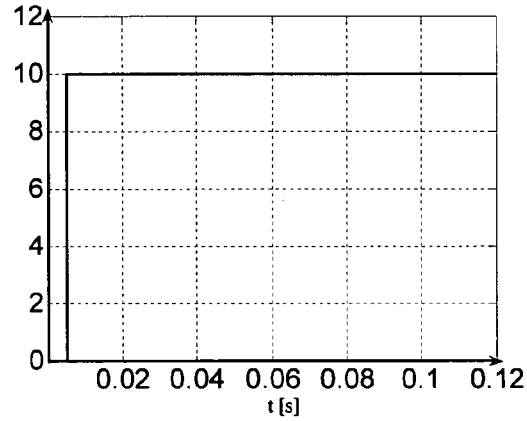

Preferably, all the peak detectors have the same architecture, shown in FIG. 24. By way of example let us refer to the case in which the input signal is the voltage supplied to the load, the waveform of which is depicted in the time graph of FIG. 25A. A differentiating block du/dt, which may be realized with an operational amplifier, generates a derivative signal (FIG. 25B). Each time the sign of the derivative signal switches from positive to negative, a zero-cross detector in correspondence of trailing edges generates a pulse (FIG. 25C). The input signal is sampled in correspondence with these pulses, and its peak value is output.

Figure 26:
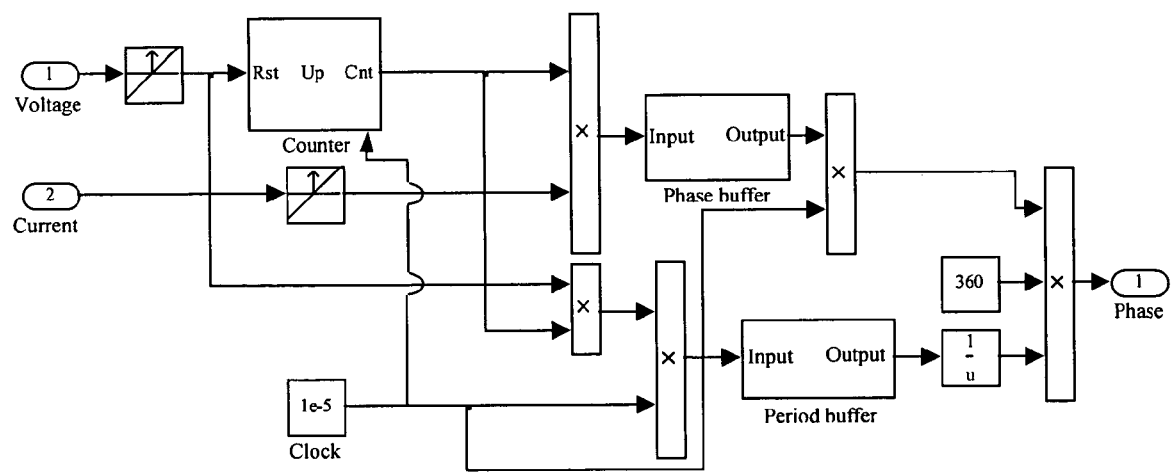
FIG. 26 is a detailed view of the block shown in FIG. 23 for estimating the phase difference between the voltage and the current.
Figure 27A:
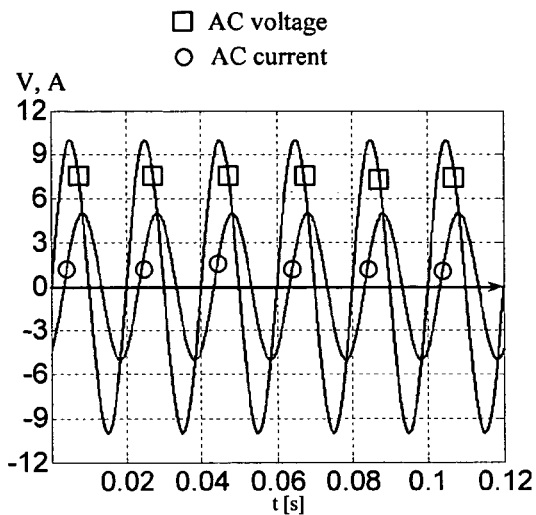
FIGS. 27A to 27D are time graphs of the main signals of the circuit depicted in FIG. 26.
Figure 27B:
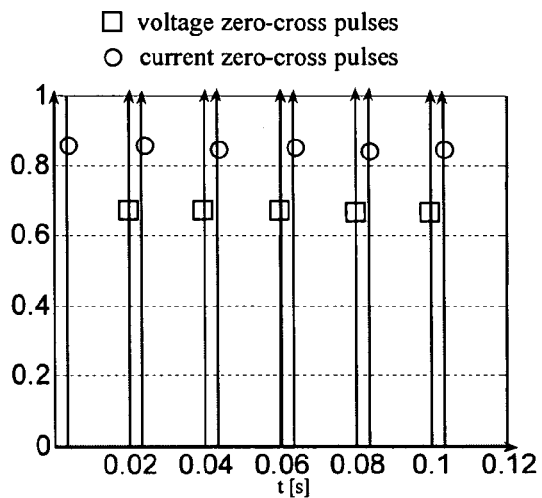
Figure 27C:
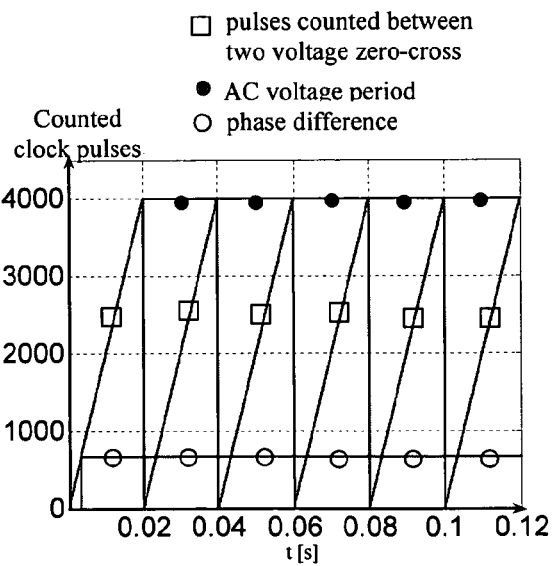

A possible embodiment of the phase estimator of FIG. 23 is shown in FIG. 26. For an easier understanding how the various blocks of the circuit of FIG. 26 function, let us refer to the sample case of FIG. 27A, in which the waveforms of voltage and current are out-of-phase by 60°. The two pulse generators generate a pulse at each zero-crossing corresponding to the leading edge of the voltage and of the current. The counter counts clock pulses between two consecutive zero-crossing of the leading edge of the voltage waveform. This counting is sampled in coincidence with the zero-crossing of the leading edge of the current waveform and is stored in the latch PHASE BUFFER. In practice, this latch stores the number of clock pulses counted between a zero-crossing of the leading edge of the voltage waveform and the successive zero-crossing of the leading edge of the current waveform.

Figure 27D:
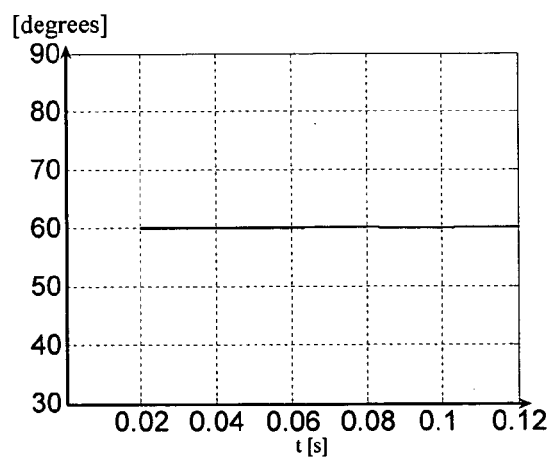

The other latch stores the maximum number of clock pulses counted by the counter, and this value represents the period of the voltage. The phase difference between the current and the voltage on the load is obtained by calculating the ratio between the value stored in the latch PHASE BUFFER and the value stored in the other latch PERIOD BUFFER and multiplying the result by 360°. For the considered case of FIG. 27D, the output of the PHASE ESTIMATOR is about 60°.

Figure 28:
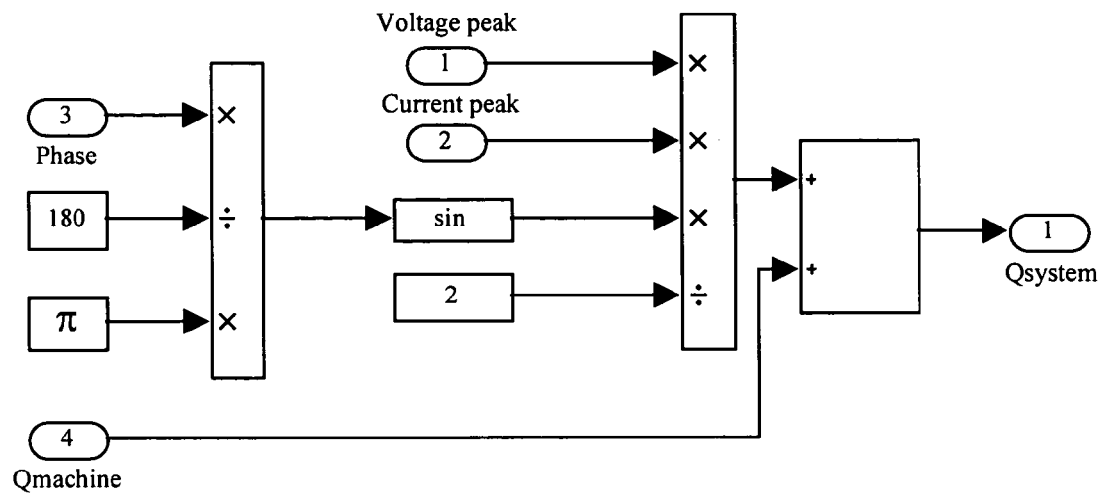
FIG. 28 is a detailed view of the output block of the circuit of FIG. 23.
Figure 29:
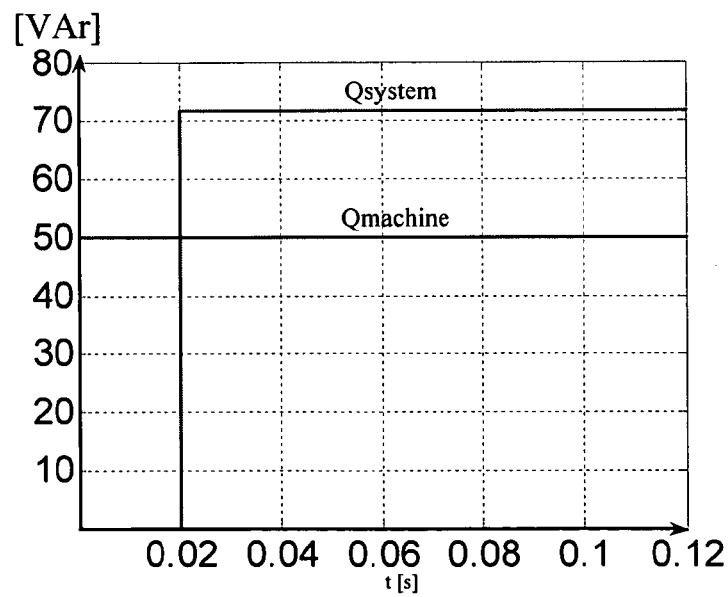
FIG. 29 depicts time graphs of the main signals of the circuit of FIG. 28.

The calculation block of FIG. 23 may have a calculating structure as depicted in FIG. 28, in a self-explanatory symbolic fashion. A time graph of the estimated reactive power Qsystem for the considered sample case of FIG. 27A, by considering a reactive power requisite, Qmachine, of 50 VAr, is shown in FIG. 29. The total reactive power needed by the system, Qsystem, is given by the following expressions:

$$V_{rms}I_{rms}\sin\varphi + Q_{machine} = \frac{10 \cdot 5}{2}\sin\left(\frac{\pi}{3}\right) + 50 = 71.65[VAr]$$

Figure 30:
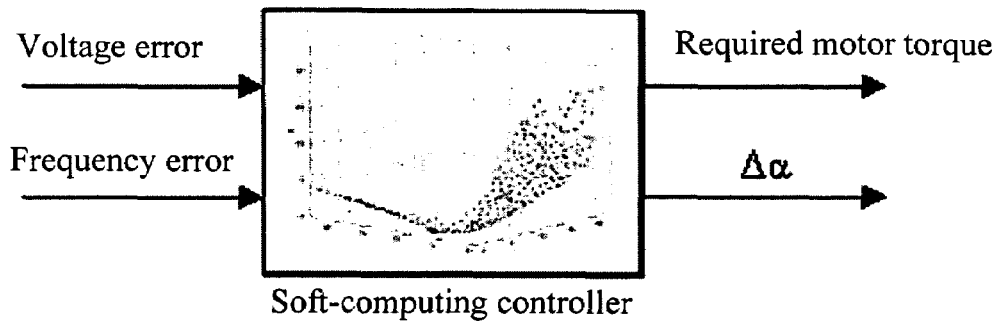
FIG. 30 depicts a soft-computing control circuit of this invention.

The scheme of FIG. 30 shows that the soft-computing controller of the asynchronous generator, for determining the turn on instant of the thyristors of the power factor correction device, processes with a soft-computing algorithm the difference between the reference voltage and the monitored voltage and the difference between the reference frequency and the frequency of the voltage supplied to the load, and generates signals that represent the required motor torque and the correction Δα of a first estimation of the turn on delay angle of the thyristors.

A sample fuzzy rule for the controller of FIG. 30 is the following:
if (voltage error is large) and (frequency error is medium) then (torque is small) and (Δα is medium).

Figure 31:
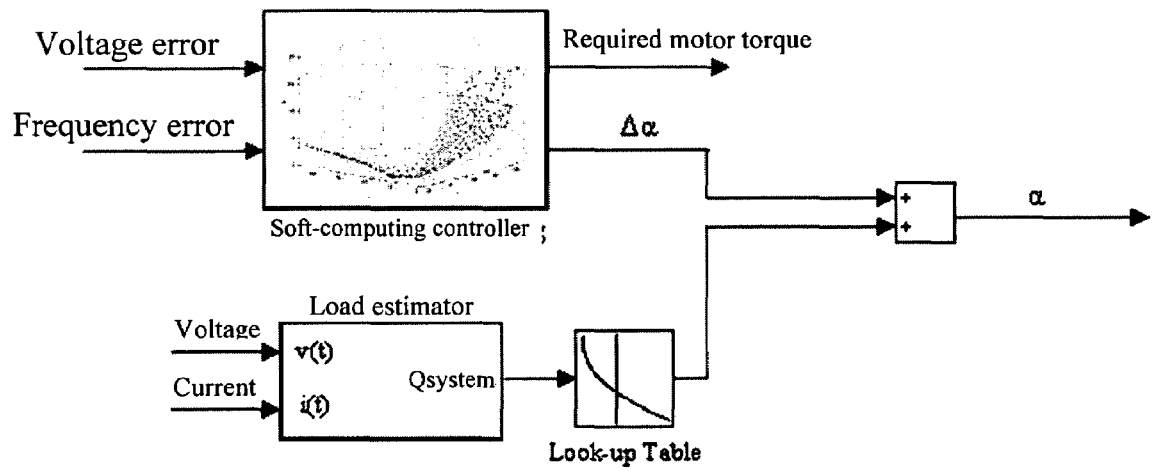
FIG. 31 depicts in detail the control feedback line of the power plant of FIG. 16.

The scheme of FIG. 31 shows how the circuit of FIG. 23 eventually determines the correct value of the total required reactive power Qsystem, by gathering a first estimation of the turn on delay angle of the thyristors from a look-up table reading the value corresponding to the reactive power Qsystem. The correct turn on delay angle α is thence established by a feed-forward mode correction of the value read from the look-up table with the computed difference Δα.

Figure 32:
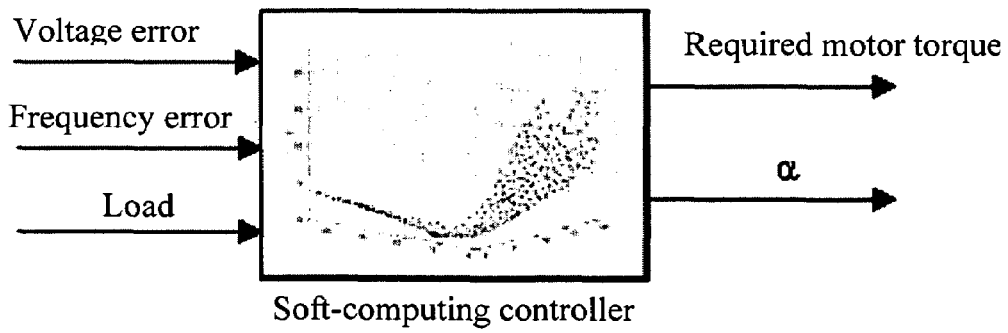
FIG. 32 shows a soft-computing control circuit according to a preferred embodiment of this invention.

An alternative embodiment includes employing a controller that processes the frequency error, the voltage error and characterizing parameters of the load, to eliminate the feed-forward corrective action. This may be done with the processor depicted in FIG. 32, that processes all input parameters with soft-computing techniques for estimating the required motor torque and the turn on angle α. Of course, with the controller of FIG. 32, it is no longer necessary the presence of the dedicated circuit of FIG. 23 for estimating the required reactive power Qsystem, because this estimation is carried out with a fuzzy algorithm.

This alternative embodiment may be preferred because it is capable of a higher accuracy than the accuracy that can be provided by the circuit of FIG. 31. According to this preferred embodiment, a power plant similar to that of FIG. 16, except that the circuit of FIG. 31 is substituted with the controller of FIG. 32, has been considered. A simulated functioning of the power plant according to this embodiment has been carried out using the nominal values of the various parameters of the asynchronous machine indicated in Table 1. Also in this case, the case of a prime mover of the asynchronous generator having a torque characteristic independent from the speed has been considered.

Figure 33A:
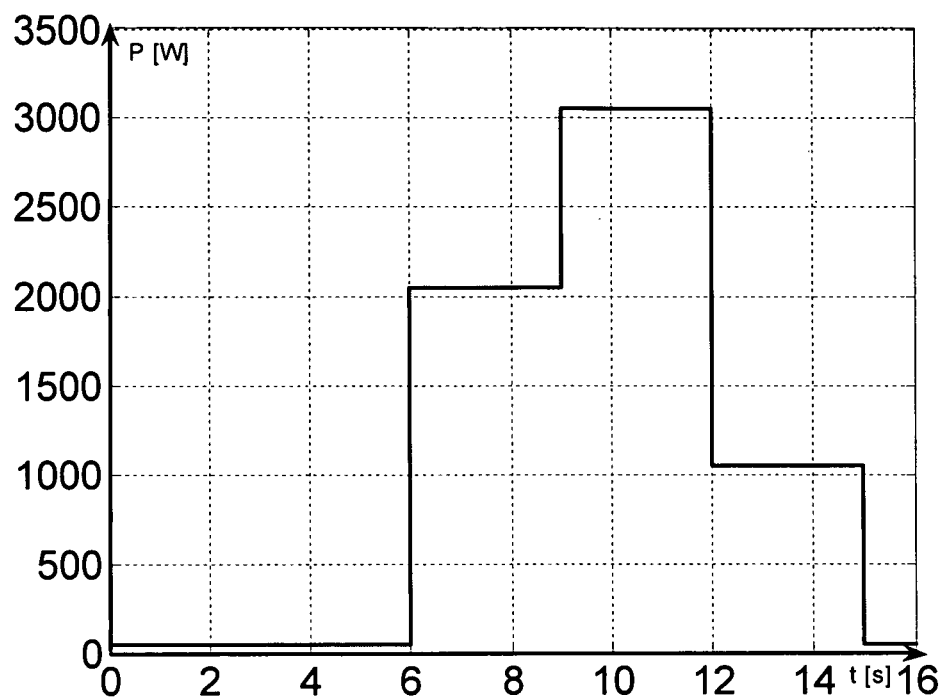
FIGS. 33A and 33B depict diagrams of the active power and of the reactive power, respectively, absorbed by the load for the circuit of FIG. 16 substituted with the controller of FIG. 32.
Figure 33B:
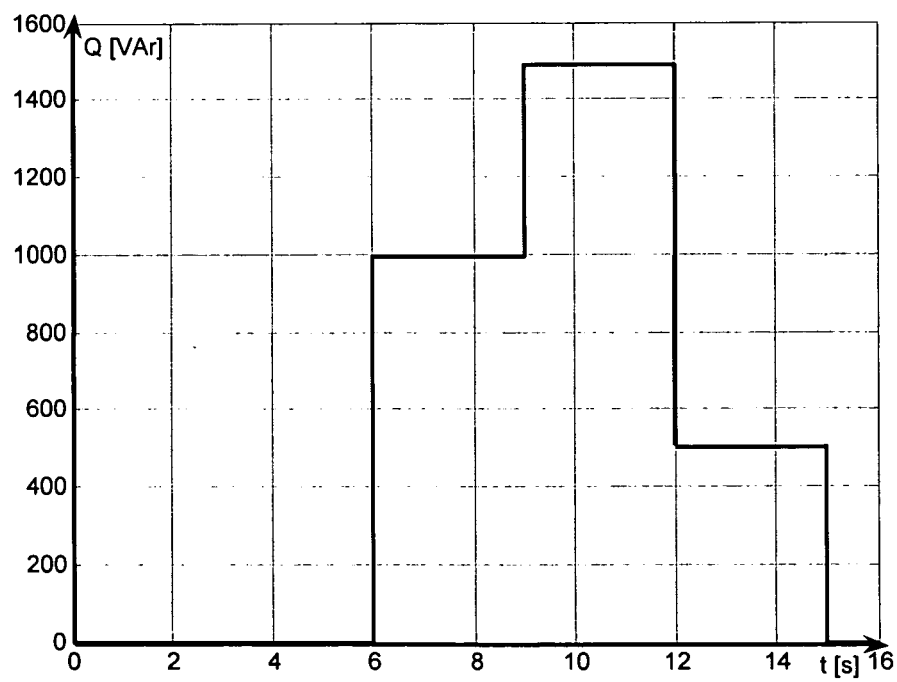

The load used for the simulations is described by the characteristics of FIG. 33A, that shows the absorbed active power P, and of FIG. 33B, that shows the needed reactive power Q. In practice, the load undergoes stepwise variations, starting from a condition in which it absorbs an active power of about 50 W, then after six seconds the active power increases to 2000 W, at nine seconds the peak value of 3050 W is attained, then at twelve seconds, the absorbed active power decreases abruptly to 2000 W and, at fifteen seconds, decreases to 1000 W.

The values of the reactive power Q shown in FIG. 33B have been attributed to have a power factor of 0.9. This is a non-limiting assumption because the devices that are normally connected to the mains have a power factor hardly smaller than 0.9. The objective of the simulation is to show that the system of FIG. 16 is capable of supplying the required active power and of matching the load, while keeping the peak voltage at 311V and the frequency at 50 Hz, that are the reference values used in FIG. 16.

The bank of excitation capacitors has an installed capacitance sufficient to absorb, under nominal functioning conditions (that is with a voltage of 220V and a frequency of 50 Hz), a three-phase capacitive reactive power of 1800 VAR.

A battery of 2.5V for setting an initial bias voltage on the bank of fixed capacitors is included.

As stated hereinafter, the inductance and the capacitance of the TCI are respectively 0.06 H and 66.5 µF. The functioning of the thyristors has been simulated with the software Simulink™.

Figure 34A:
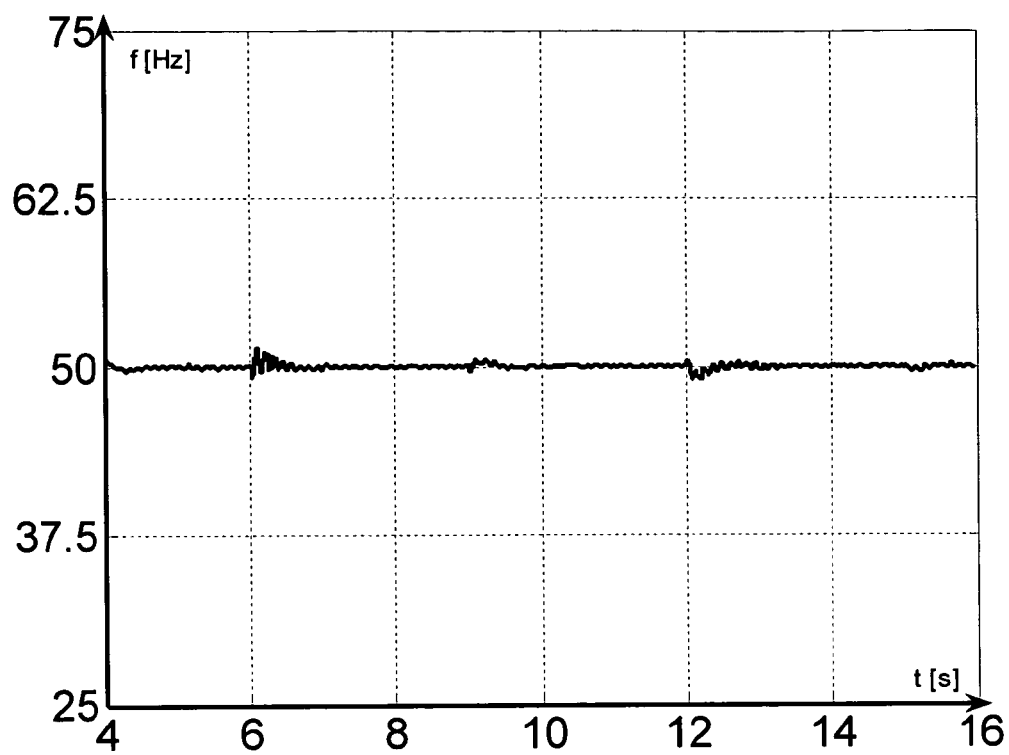
FIGS. 34A and 34B show time diagrams of the frequency and of the voltage, respectively, obtained by simulations in accordance with the invention.
Figure 34B:
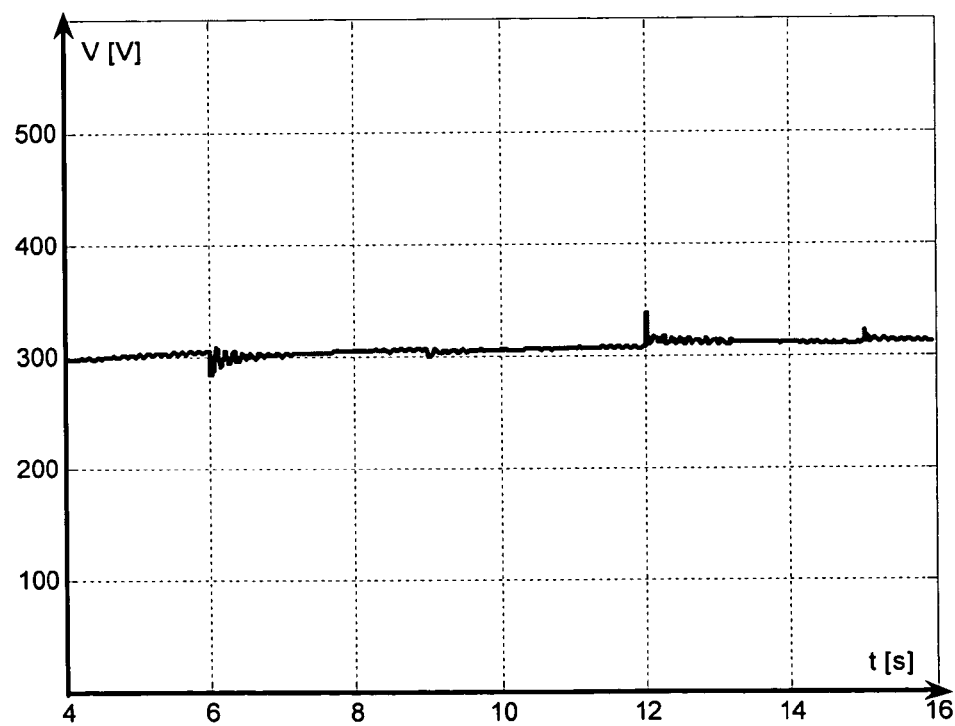
Figure 35:
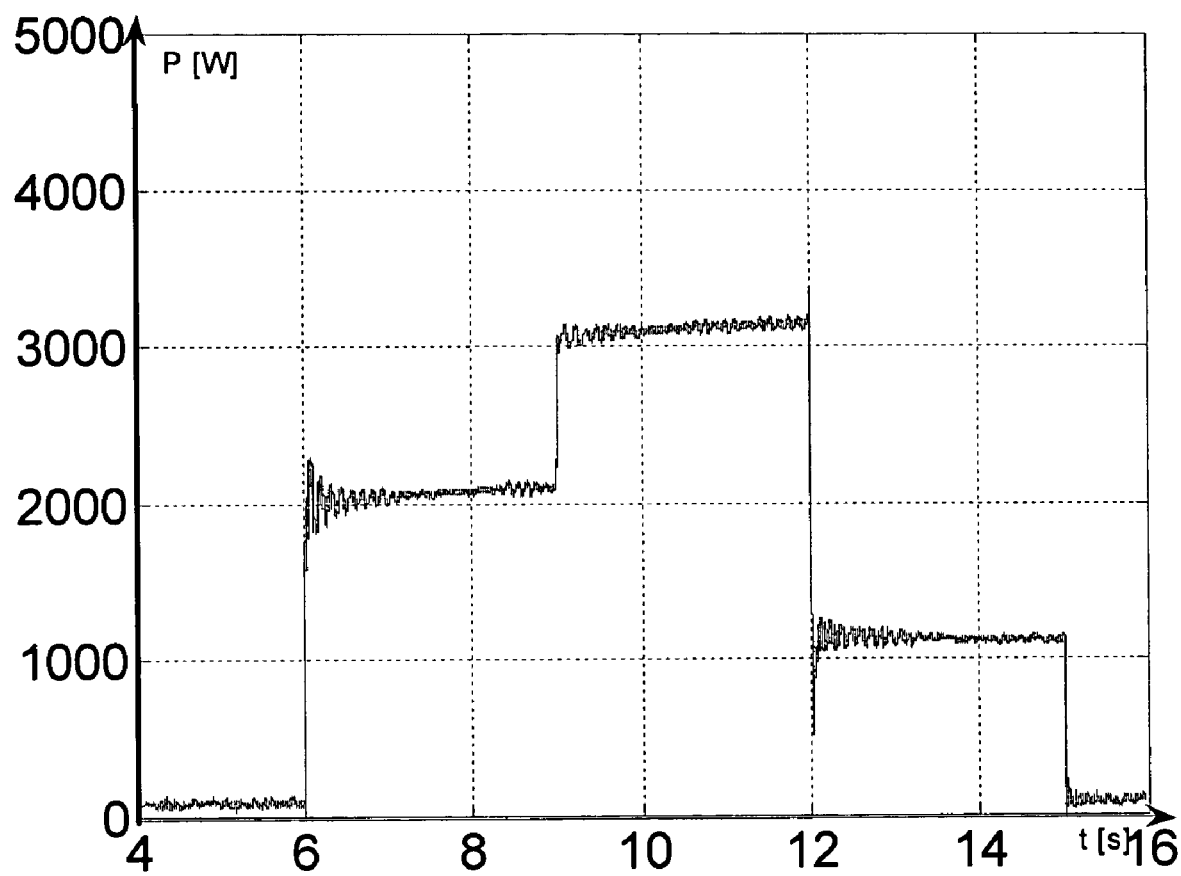
FIG. 35 shows the active power generated by the asynchronous machine in accordance with the invention.

The results of the simulation are depicted in Figures from 34 to 36. FIG. 34A shows the time graph of the output frequency f and FIG. 34B shows the time graph of the output voltage V. As noticeable, the frequency is strictly kept around its nominal value of 50 Hz while the voltage has a steady-state value of 311V, FIG. 35 depicts the time graph of the active power delivered by the generator, that substantially tracks that depicted in FIG. 33.

Figure 36A:
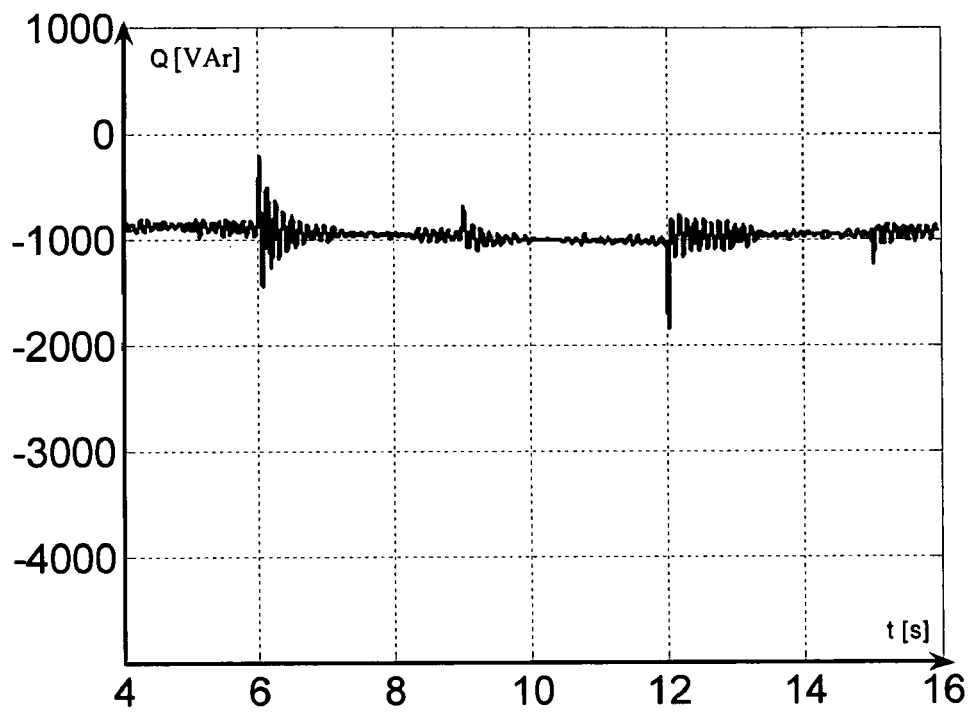
FIGS. 36A and 36B depict time graphs of the reactive power absorbed by the asynchronous machine and of the turn on angle of the thyristors of the circuit of FIG. 19, respectively.

The time graph of FIG. 36A depicts the reactive power Q provided by the TCI plus that provided by the bank of fixed capacitors minus that absorbed by the load: in practice, it is the reactive power needed for matching the generator.

Figure 36B:
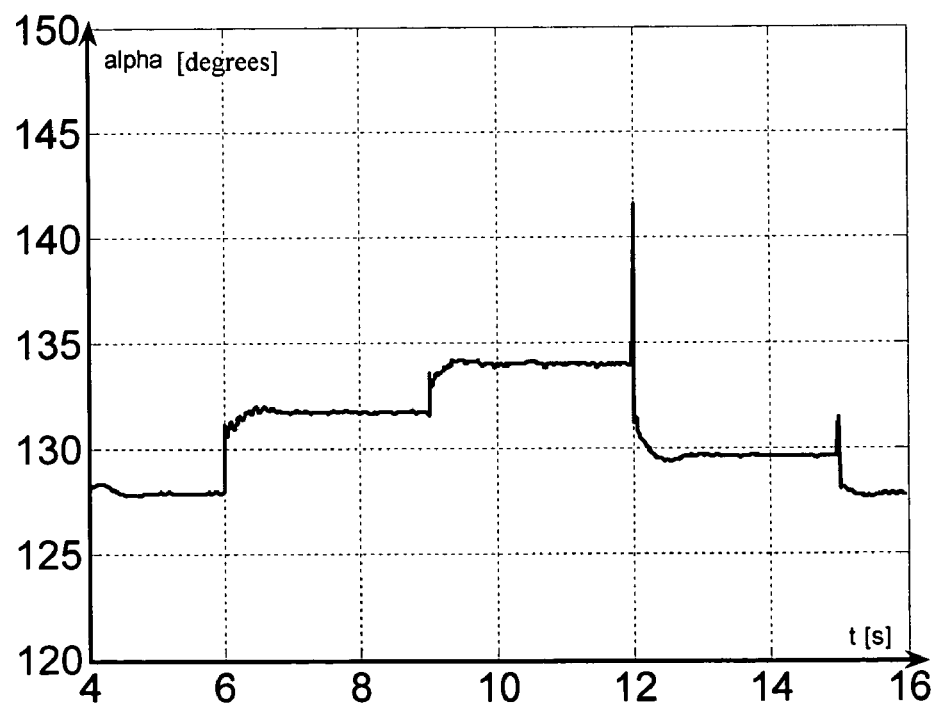

It is worth noticing that the reactive power generated by the asynchronous generator is substantially constant, because the variations of the reactive power absorbed by the load are compensated by adjusting the turn on delay angle α of the TCIs, as shown in the timing diagram of FIG. 36B.

The reactive power compensation system of this invention is very simple to be realized and may avoid the use of the complicated structures that are commonly used for controlling the output voltage and the frequency of asynchronous generators, with a consequent reduction of costs.

That which is claimed is:

1. A control circuit for an electric power plant comprising an asynchronous generator of an AC voltage, a motor to rotate a rotor of the asynchronous generator as a function of a first control signal of a developed motor torque, and a bank of capacitors coupled to the asynchronous generator and having a total capacitance varying as function of a second control signal, the control circuit comprising:
   a monitor circuit to monitor at least one parameter of the AC voltage; and
   a control signal generator circuit cooperating with said monitor circuit to generate the first and second control signals by soft-computing techniques both as a function of the frequency and of a representative value of an amplitude of the AC voltage to make the AC voltage have a desired amplitude and frequency.

2. The control circuit of claim 1 wherein the representative value comprises a peak of the AC voltage.

3. The control circuit of claim 1 wherein the representative value comprises a root-mean-square value of the AC voltage.

4. The control circuit of claim 1 wherein said control signal generator comprises a trained neural network.

5. The control circuit of claim 1 wherein said control signal generator comprises a fuzzy logic system.

6. An electric power plant comprising:
   an asynchronous generator of an AC voltage;
   a motor to rotate a rotor of the asynchronous generator as a function of a first control signal of a developed motor torque;
   a bank of capacitors coupled to said asynchronous generator and having a capacitance and varying as function of a second control signal; and
   a control circuit to generate the first and second control signals by soft-computing techniques both as a function of the frequency and of a representative value of an amplitude of the AC voltage to make the AC voltage have a desired amplitude and frequency.

7. The electric power plant of claim 6 further comprising a frequency-meter coupled to the AC voltage and providing to said control circuit a third signal representing the frequency of the AC voltage.

8. The electric power plant of claim 6 wherein the representative value comprises a peak of the AC voltage.

9. The electric power plant of claim 6 wherein the representative value comprises a root-mean-square value of the AC voltage.

10. The electric power plant of claim 6 wherein said control circuit comprises a trained neural network.

11. A method of controlling an electric power plant comprising an asynchronous generator of an AC voltage, a motor to rotate a rotor of the asynchronous generator as a function of a first control signal of a developed motor torque, and a bank of capacitors coupled to the asynchronous generator and having a total capacitance varying as function of a second control signal, the control method comprising:
   monitoring at least one parameter of the AC voltage; and
   generating the first and second control signals by soft-computing techniques both as a function of the frequency and of a representative value of an amplitude of the AC voltage to make the AC voltage have a desired amplitude and frequency.

12. The method of claim 11 wherein the representative value comprises a peak of the AC voltage.

13. The method of claim 11 wherein the representative value comprises a root-mean-square value of the AC voltage.

14. The method of claim 11 wherein generating comprises generating the first and second control signals using a trained neural network.

15. The method of claim 11 wherein generating comprises generating the first and second control signals using a fuzzy logic system.

16. A method of generating electric power comprising:
   installing an asynchronous generator of an AC voltage;
   installing a motor for rotating a rotor of the asynchronous generator to be input with a first control signal of a generated motor torque;
   installing a bank of capacitors coupled to the asynchronous generator and having a total capacitance varying as function of a second control signal; and generating the first and second control signals by soft-computing techniques both as a function of the frequency and of a representative value of an amplitude of the AC voltage to make the AC voltage have a desired amplitude and frequency.

17. The method of claim 16 wherein the representative value comprises a peak of the AC voltage.

18. The method of claim 16 wherein the representative value comprises a root-mean-square value of the AC voltage.

19. The method of claim 16 wherein generating comprises generating the first and second control signals using a trained neural network.

20. The method of claim 16 wherein generating comprises generating the first and second control signals using a fuzzy logic system.

21. A computer readable medium for controlling an electric power plant comprising an asynchronous generator of an AC voltage, a motor to rotate a rotor of the asynchronous generator as a function of a first control signal of a developed motor torque, and a bank of capacitors coupled to the asynchronous generator and having a total capacitance varying as function of a second control signal, the computer readable medium for:
  monitoring at least one parameter of the AC voltage; and
  generating the first and second control signals by soft-computing techniques both as a function of the frequency and of a representative value of an amplitude of the AC voltage to make the AC voltage have a desired amplitude and frequency.

22. The method of claim 21 wherein the representative value comprises a peak of the AC voltage.

23. The method of claim 21 wherein the representative value comprises a root-mean-square value of the AC voltage.

24. The method of claim 21 wherein generating comprises generating the first and second control signals using a trained neural network.

25. The method of claim 21 wherein generating comprises generating the first and second control signals using a fuzzy logic system.

* * * * *

UNITED STATES PATENT AND TRADEMARK OFFICE
CERTIFICATE OF CORRECTION

PATENT NO. : 7,459,890 B2
APPLICATION NO. : 11/286586
DATED : December 2, 2008
INVENTOR(S) : Baratto et al.

It is certified that error appears in the above-identified patent and that said Letters Patent is hereby corrected as shown below:

| | |
|---|---|
| Column 1, Line 38 | Delete: "an wind"<br>Insert: --a wind-- |
| Column 2, Line 9 | Delete: "consideration"<br>Insert: --considerations-- |
| Column 2, Line 24 | Delete: " $R'_r$ "<br><br>Insert: -- $R'_r$ is-- |
| Column 2, Line 31 | Delete: "$C$ e $R_L$"<br>Insert: --$C$ and $R_L$-- |
| Column 2, Line 36 | Delete: "slip a"<br>Insert: --slip σ-- |
| Column 5, Line 9 | Delete: "conditions"<br>Insert: --condition-- |
| Column 5, Line 25 | Delete: "innovative"<br>Insert: --innovation-- |

UNITED STATES PATENT AND TRADEMARK OFFICE
CERTIFICATE OF CORRECTION

PATENT NO. : 7,459,890 B2
APPLICATION NO. : 11/286586
DATED : December 2, 2008
INVENTOR(S) : Baratto et al.

It is certified that error appears in the above-identified patent and that said Letters Patent is hereby corrected as shown below:

Column 5, Line 39   Delete: "them one"
                    Insert: --them--

Column 8, Line 10   Delete: "$\Delta$tm"
                    Insert: --$\Delta$Tm--

Column 10, Line 42  Delete: "of a"
                    Insert: --of an--

Signed and Sealed this

Fifteenth Day of September, 2009

David J. Kappos
*Director of the United States Patent and Trademark Office*